United States Patent
Shimizu et al.

(10) Patent No.: US 9,031,339 B2
(45) Date of Patent: *May 12, 2015

(54) IMAGE ENCODING METHOD, IMAGE DECODING METHOD, IMAGE ENCODING DEVICE, IMAGE DECODING DEVICE, IMAGE ENCODING PROGRAM, AND IMAGE DECODING PROGRAM

(75) Inventors: Shinya Shimizu, Yokosuka (JP); Hideaki Kimata, Yokosuka (JP); Norihiko Matsuura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/004,194

(22) PCT Filed: Mar. 13, 2012

(86) PCT No.: PCT/JP2012/056442
§ 371 (c)(1),
(2), (4) Date: Sep. 10, 2013

(87) PCT Pub. No.: WO2012/124698
PCT Pub. Date: Sep. 20, 2012

(65) Prior Publication Data
US 2014/0003511 A1    Jan. 2, 2014

(30) Foreign Application Priority Data
Mar. 14, 2011  (JP) .................. 2011-055238

(51) Int. Cl.
*G06K 9/36*   (2006.01)
*G06T 9/00*   (2006.01)
(Continued)

(52) U.S. Cl.
CPC .......... *H04N 19/00569* (2013.01); *G06T 9/001* (2013.01); *G06T 9/40* (2013.01); *H04N 19/20* (2013.01); *H04N 19/46* (2013.01); *H04N 19/597* (2013.01); *H04N 19/96* (2013.01)

(58) Field of Classification Search
None
See application file for complete search history.

(56) References Cited

U.S. PATENT DOCUMENTS 5,838,455 A   11/1998  Imaizumi et al.
6,320,981 B1  11/2001  Yada
(Continued)

FOREIGN PATENT DOCUMENTS

JP   09-289638 A    11/1997
JP   2003-304562 A  10/2003
(Continued)

OTHER PUBLICATIONS

Morvan, Yannick, and Dirk Farin. "Platelet-based coding of depth maps for the transmission of multiview images." Electronic Imaging 2006. International Society for Optics and Photonics, 2006.*
(Continued)

*Primary Examiner* — Li Liu
(74) *Attorney, Agent, or Firm* — Harness, Dickey & Pierce, P.L.C.

(57) ABSTRACT

An image-encoding device uses a region having similar image signals in a block in each encoding target block as an object, and performs set-up by associating a pixel value representing the object with an object identifier as an object pixel value. An object map generation unit generates an object map indicating that each pixel in the block belongs to which object, using object identifiers. By use of the object map generation unit, a predicted image that is used by a predicted image generation unit to predict an encoding target block is generated. An object map encoding-unit compares an object map used when encoding a reference region that has been encoded and encodes an object map.

18 Claims, 23 Drawing Sheets

(51) Int. Cl.
| | |
|---|---|
| G06T 9/40 | (2006.01) |
| H04N 19/50 | (2014.01) |
| H04N 19/20 | (2014.01) |
| H04N 19/46 | (2014.01) |
| H04N 19/597 | (2014.01) |
| H04N 19/96 | (2014.01) |

(56) References Cited

U.S. PATENT DOCUMENTS

| | | | |
|---|---|---|---|
| 7,245,768 B1* | 7/2007 | Harman et al. | 382/232 |
| 7,894,633 B1* | 2/2011 | Harman | 382/106 |
| 2002/0039441 A1 | 4/2002 | Klassen | |
| 2002/0154693 A1 | 10/2002 | Demos et al. | |
| 2004/0022322 A1 | 2/2004 | Dye | |
| 2005/0063596 A1 | 3/2005 | Yomdin et al. | |
| 2007/0269116 A1 | 11/2007 | Lo | |
| 2009/0097557 A1 | 4/2009 | Takahashi et al. | |
| 2010/0231688 A1* | 9/2010 | Park et al. | 348/42 |
| 2011/0206288 A1* | 8/2011 | Lee et al. | 382/233 |
| 2012/0200669 A1* | 8/2012 | Lai et al. | 348/43 |

FOREIGN PATENT DOCUMENTS

| | | |
|---|---|---|
| JP | 2006-148892 A | 6/2006 |
| JP | 2005-518157 A | 8/2006 |
| JP | 2009-212664 A | 9/2009 |
| JP | 2009-296338 A | 12/2009 |
| JP | 2010-157825 A | 7/2010 |
| JP | 2010-266982 A | 11/2010 |
| JP | 2012-074917 A | 4/2012 |
| JP | 2012-074918 A | 4/2012 |
| WO | 98/15915 A1 | 4/1998 |
| WO | 01/84846 A2 | 11/2001 |
| WO | WO-2004-075531 A2 | 9/2004 |
| WO | 2009/112742 A1 | 9/2009 |

OTHER PUBLICATIONS

Shen, Godwin, et al. "Edge-aware intra prediction for depth-map coding." Image Processing (ICIP), 2010 17th IEEE International Conference on. IEEE, 2010.*
C. Fehn, et al., "An Evolutionary and Optimised Approach on 3D-TV," Proceedings of International Broadcast Conference, pp. 357-365, Amsterdam, The Netherlands, Sep. 2002.
W.H.A. Bruls, et al., "Enabling Introduction of Stereoscopic (3D) Video: Formats and Compression Standards," Proceedings of IEEE International Conference on Image Processing, pp. I-89-I-92, San Antonio, USA, Sep. 2007.
A. Smolic, et al., "Multi-view video plus depth (MVD) format for advanced 3D video systems," Joint Video Team of ISO/IEC JTC1/SC29/WG11 and ITU-T SG16 Q.6, Doc. JVT-W100, San Jose, USA, Apr. 2007.
C. L. Zitnick, et al., "High-quality Video View Interpolation Using a Layered Representation," ACM Transactions on Graphics, vol. 23, No. 3, pp. 600-608, Aug. 2004.
Recommendation ITU-T H.264, "Advanced video coding for generic audiovisual services," Mar. 2009.
Kunio Nobori et al., "Object-based image coding using range data", 1999 Nen The Institute of Electronics, Information and Communication Engineers SOGO Taokai Koen Ronbunshu Joho System 2, Mar. 8, 1999, p. 64.
D.V.S.X. De Silva et al., Object Based Coding of the Depth Maps for 3D Video Coding, IEEE Transactions on Consumer Electronics, 2009.08, vol. 55, No. 3, pp. 1699-1706.
Shinya Shimizu et al., "Ko Koritsu Depth Map Fugoka no Tameno Object Base Yosoku Hoshiki", 2011 Nendo The Institute of Image Electronics Engineers of Japan Dai 39 Kai Nenji Taikai Yokoshu (DVD-ROM), Jun. 25, 2011.
International Search Report for PCT/JP2012/056442, ISA/JP, mailed Jun. 19, 2012.
Shimizu, Shinya, et al., "Block-Adaptive Palette-Based Prediction for Depth Map Coding," 18th IEEE International Conference on Image Processing, Sep. 11-14, 2011, pp. 117-120.
Tzovaras, Dimitrios, et al., "Object-Based Coding of Stereo Image Sequences Using Joint 3-D Motion/Disparity Compensation," IEEE Transactions on Circuits and Systems for Video Technology, vol. 7, No. 2, Apr. 1997, pp. 312-327.
Ebrahimi, Touradj, et al., "MPEG-4 natural video coding—An overview," Signal Processing: Image Communication, vol. 15, Nos. 4-5, Jan. 2000, pp. 365-385.
Zhu, Bo, et al., "View Synthesis Oriented Depth Map Coding Algorithm," 2009 Asia-Pacific Conference on Information Processing, pp. 104-107.
Lie, Wen-Nung, et al., "Multi-spectral Satellite Image Compression Based on Multi-Mode Linear Prediction," Proc. of SPIE, Visual Communications and Image Processing, 2000, pp. 848-855.
Morvan, Yannick, et al., "Depth-Image Compression Based on an R-D Optimized Quadtree Decomposition for the Transmission of Multiview Images," IEEE International Conference on Image Processing, Sep. 1, 2007, pp. V-105-V-108.
Search Report, International Patent Application No. PCT/JP2011/071463, Nov. 8, 2011.
Search Report, International Patent Application No. PCT/JP2011/071315, Nov. 8, 2011.
Search Report, European Patent Application No. 11828887.7, Jun. 18, 2014.
Search Report, European Patent Application No. 11828851.3, Jun. 18, 2014.
Office Action, Taiwanese Patent Application No. 100134544, Jul. 16, 2014.
Office Action, Taiwanese Patent Application No. 100134543, Oct. 13, 2014.
Search Report, European Patent Application No. 12757661.9, Oct. 21, 2014.
Notice of Non-Final Rejection, Korean Patent Application No. 10-2013-7023849, Feb. 26, 2015.
Examination Report from the Intellectual Property Office, Taiwanese Patent Application No. 101108263, Mar. 20, 2015.

* cited by examiner

FIG. 4

| 0 | 0 | 0 | 0 | 0 | 0 | 0 | 2 |
|---|---|---|---|---|---|---|---|
| 0 | 0 | 0 | 0 | 0 | 0 | 2 | 2 |
| 0 | 0 | 0 | 0 | 1 | 1 | 2 | 2 |
| 0 | 0 | 0 | 0 | 1 | 1 | 1 | 2 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 1 | 1 | 1 | 1 | 1 | 1 | 1 |

IMAGE ENCODING METHOD, IMAGE DECODING METHOD, IMAGE ENCODING DEVICE, IMAGE DECODING DEVICE, IMAGE ENCODING PROGRAM, AND IMAGE DECODING PROGRAM

CROSS REFERENCE TO RELATED APPLICATIONS

This application is a 371 U.S. National Stage of International Application No. PCT/JP2012/056442, filed Mar. 13, 2013, which claims priority to Japanese Patent Application No. 2011-055238, filed Mar. 14, 2011. The entire disclosures of the above applications are incorporated herein by reference.

TECHNICAL FIELD

The present invention relates to encoding of a distance image and a decoding technology thereof.

BACKGROUND ART

A distance image is an image obtained by expressing a distance from a camera to an object as pixel values. Since the distance from the camera to the object may be called a depth of a scene, the distance image is also called a depth image. Furthermore, since the depth is also called depth, it can also be called a depth map. In the field of computer graphics, since the depth indicates information stored in a Z buffer, there is also a Z image or a Z map. Moreover, in addition to the distance from the camera to the object, a coordinate value for a Z axis of a three-dimensional coordinate system provided in a space to be expressed is also utilized as a distance (a depth). Since a horizontal direction is set as an X axis and a vertical direction is set as a Y axis with respect to a generally captured image, a Z axis coincides with an orientation of a camera. However, as with the case in which a common coordinate system is used for a plurality of cameras, there are cases in which a Z axis does not coincide with an orientation of a camera. Hereinafter, the distance, the depth, and the Z value are called distance information without distinguishing them from one another, and an image obtained by expressing the distance information as pixel values is called a distance image.

The distance information is expressed as pixel values using a method in which values corresponding to quantization amounts are used as pixel values as is, a method in which values obtained by quantizing between a minimum value and a maximum value into a certain value are used, or a method in which values obtained by quantizing differences from the minimum value by a certain step width are used. When a range to be expressed is limited, additional information such as the minimum value is used, so that it is possible to express the distance information with high accuracy.

Furthermore, quantization is performed at a regular interval using a method in which a physical amount is quantized as is, or a method in which a reciprocal of the physical amount is quantized. In general, since a reciprocal of distance information is a value proportional to parallax, the former method is mainly used when it is necessary to express the distance information with high accuracy, and the latter method is mainly used when it is necessary to express parallax information with high accuracy. Hereinafter, regardless of the method for expressing the distance information as the pixel values and the quantization method, all images obtained by expressing the distance information as images are called distance images.

One of the purposes for which the distance images are used is a 3D image. The term general stereoscopic image relates to a stereo image including an image for the right eye and an image for the left eye of an observer. However, it is possible to express a 3D image using an image in a certain camera and a distance image thereof (for more details, refer to Non-Patent Document 1).

In a scheme for encoding a 3D image expressed using a video and a distance image in one viewpoint, MPEG-C Part.3 (ISO/IEC 23002-3) is available (for more details, refer to Non-Patent Document 2).

The video and the distance image are held for multiple viewpoints so that it is possible to express a 3D image having larger parallax than in a 3D image that may be expressed from a single viewpoint (for more details, refer to Non-Patent Document 3).

Furthermore, in addition to expressing such a 3D image, the distance image is also used as data for generating a free viewpoint image for which a viewer is able to freely move a viewpoint without regard to the arrangement of a photographic camera. A synthesized image when viewing a scene from a camera separately from such a photographic camera is called a virtual viewpoint image, and a generation method thereof is actively discussed in the field of image-based rendering. A representative technique for generating a virtual viewpoint image from multi-viewpoint video and a distance image is disclosed in Non-Patent Document 4.

Since the distance image is configured by one component, it may be regarded as a grayscale image. Furthermore, since objects continuously exist in real space and are not able to instantaneously move to a distant position, it may be said that the object has a spatial correlation and a temporal correlation similarly to an image signal.

Consequently, by an image-encoding scheme or a moving image-encoding scheme used in order to encode a normal image signal or video signal, it is possible to efficiently encode a distance image and a distance moving image while removing spatial redundancy and temporal redundancy. Actually, in the MPEG-C Part.3, encoding is performed using an existing moving image encoding scheme.

Hereinafter, a conventional general video signal-encoding scheme will be described. In general, since an object has spatial and temporal continuity in real space, the appearance of the object has a high correlation spatially and temporally. In the encoding of a video signal, high encoding efficiency is achieved utilizing the correlation.

In detail, a video signal of an encoding target block is predicted from an already encoded video signal and only a prediction residue thereof is encoded, so that the amount of information needed to be encoded is reduced, resulting in the achievement of high encoding efficiency. As a representative prediction technique of a video signal, there are intra-frame prediction in which a predicted signal is spatially generated from adjacent blocks, and motion-compensated prediction in which the motion of an object is estimated from encoded frames captured at different times and a predicted signal is temporally generated.

Furthermore, in order to utilize a spatial correlation and characteristics of human visual systems, a prediction error called a prediction residual signal is transformed into data in a frequency domain using a DCT or the like, so that energy of the residual signal is concentrated on a low frequency region, thereby efficient encoding is performed. For more details, refer to MPEG-2, H.264, and MPEG-4 AVC (Non-Patent Document 5), which are international standards for moving picture coding.

DOCUMENTS OF THE PRIOR ART

Non-Patent Documents

Non-Patent Document 1: C. Fehn, P. Kauff, M. Op de Beeck, F. Emst, W. Usselsteijn, M. Pollefeys, L. Van Gool, E. Ofek and I. Sexton, "An Evolutionary and Optimised Approach on 3D-TV," Proceedings of International Broadcast Conference, pp. 357-365, Amsterdam, The Netherlands, September 2002.

Non-Patent Document 2: W. H. A. Bruls, C. Varekamp, R. Klein Gunnewiek, B. Barenbrug and A. Bourge, "Enabling Introduction of Stereoscopic (3D) Video: Formats and Compression Standards," Proceedings of IEEE International Conference on Image Processing, pp.I-89-I-92, San Antonio, USA, September 2007.

Non-Patent Document 3: A. Smolic, K. Mueller, P. Merkle, N. Atzpadin, C. Fehn, M. Mueller, O. Schreer, R. Tanger, P. Kauff and T. Wiegand, "Multi-view video plus depth (MVD) format for advanced 3D video systems," Joint Video Team of ISO/IEC JTC1/SC29/WG11 and ITU-T SG16 Q.6, Doc. JVT-W100, San Jose, USA, April 2007

Non-Patent Document 4: C. L. Zitnick, S. B. Kang, M. Uyttendaele, S. A. J. Winder, and R. Szeliski, "High-quality Video View Interpolation Using a Layered Representation," ACM Transactions on Graphics, vol. 23, no. 3, pp. 600-608, August 2004.

Non-Patent Document 5: Recommendation ITU-T H.264, "Advanced video coding for generic audiovisual services," March 2009.

DISCLOSURE OF INVENTION

Problems to be Solved by the Invention

An object has a high spatial correlation because it is continuous in real space and has a high temporal correlation because it is not possible to instantaneously move to a distant position. Consequently, by using the existing moving image-encoding scheme using the spatial correlation and the temporal correlation, it is possible to efficiently encode a distance image expressed as a grayscale image.

However, since distance information shows a small change in an object and shows a significantly large difference between objects, a predictive residual in which exact prediction is possible is significantly small, or a predictive residual in which perfectly valid prediction is not possible is significantly large as a result of spatial or temporal prediction. That is, a strong edge is generated in a predictive residual signal. When such a strong edge is converted into data in a frequency space using a DCT and the like, since energy of the residual signal may not be concentrated on a low frequency region, many high frequency components are generated. As a consequence, it is not possible to efficiently encode the residual signal.

FIG. 1 illustrates an example of a block with 9×9 pixels of a distance image. In the block, there are two objects, pixel values of one object are around 50 and pixel values of the other object are around 200. In spatial prediction, information of a first row and a first column of the block is used to predict the remaining 8×8 pixels. That is, pixel values of a block to be processed of 8×8 pixels are predicted using pixel values of adjacent pixels adjacent at an upper side and a left side.

There are various prediction methods. However, FIG. 1 illustrates two representative prediction methods employed in H.264, that is, two examples of horizontal prediction and vertical prediction. As illustrated in the center column of FIG. 1, a predictive residual mainly has three values of around −150, around 0, and around 150, and a large edge is generated.

A result obtained by applying a two-dimensional DCT (discrete cosine transform) of 8×8 to the predictive residual is the rightmost column. A DC component is the deepest in FIG. 1 and a frequency increases as it goes right and left. As is apparent from FIG. 1, in all cases, a large signal is generated in many high frequency regions and the compaction of a residual signal is failed.

It is also possible to perform encoding using only a transform such as a DCT without prediction. However, since it is not possible to remove a spatial correlation with another block, encoding efficiency is further reduced. Furthermore, it is also possible to perform encoding without a transform such as a DCT. However, in this case, since it is not possible to use a local correlation in a block, efficient encoding is not achieved.

In light of the foregoing, an object of the present invention is to provide a technology related to image encoding for efficiently encoding an image such as a distance image, which has pixel values significantly depending on an object, using a representative pixel value and object identification information for each object with respect to the image such as a distance image, which has pixel values significantly depending on an object, and a technology related to image decoding for decoding a bit stream thereof.

Means for Solving the Problem

In the image encoding of the present invention, the following processes are performed.

(1) The number of objects in a block is set as an object number.

(2) Objects corresponding to the number of objects are assumed to be in the block, and one pixel value for each object is set as an object pixel value.

(3) An object identifier for identifying an object is associated with the object pixel value, and an object map is generated from a pixel value of each pixel in the block and the object pixel value, the object map indicating an object captured in each pixel in the block by the object identifier.

(4) An object map, which has been used when encoding an image (a video) signal of an encoded block around the block, is set as a reference object map.

(5) A predicted image for the block is generated by assigning the object pixel value to each pixel according to the object map.

(6) The object map is encoded while performing prediction using the reference object map.

(7) Predictive encoding is performed on an image signal for the block using the predicted image.

(8) There are a case in which the object number is encoded and a case in which the object number is not encoded. In the step of setting the object number in (1), when the object number has been set using only information which may be referred to by a decoding side, the encoding is not performed. In other cases, the encoding is performed. The case of performing no encoding, for example, includes a case of setting a predetermined object number or a case of setting the object number by predicting it from image information or an object number of an encoded block around a block. The case of performing the encoding, for example, includes a case of setting the object number by analyzing a pixel value of a block. In addition, the encoding includes a method for encoding the object number as is, and a method for generating a predicted value using only the information which may be referred to by the decoding side and encoding a difference value with the predicted value in order to reduce a code amount of the object number.

(9) There are a case in which the object pixel value is encoded and a case in which the object pixel value is not encoded. In the step of setting the object pixel value in (2), when the object pixel value has been set using only the information which may be referred to by the decoding side, the encoding is not performed. In other cases, the encoding is performed. The case of performing no encoding, for example, includes a case of setting the object pixel value by predicting it from the image information or the object pixel value of the encoded block around the block. The case of performing the encoding, for example, includes a case of setting the object pixel value by analyzing the pixel value of the block. In addition, the encoding includes a method for encoding the object pixel value as is, and a method for generating a predicted value using only the information which may be referred to by the decoding side and encoding a difference value with the predicted value in order to reduce a code amount of the object pixel value. In order to generate the predicted value, it is possible to use the image information or the object pixel value of the encoded block around the block, and an object pixel value that is first encoded in an encoding order.

(10) Code data of the object map, code data of the image signal, code data when the object number is encoded, and code data when the object pixel value is encoded are multiplexed and output.

As described above, in order to generate the predicted image, the present invention uses two types of additional information of the object pixel value, which is a representative pixel value of an object, and the object map indicating an object pixel value to be used to generate the predicted image for each pixel. As compared with the conventional art using information of a "predictive direction" in order to generate the predicted image, the present invention increases the code amount of the additional information, but generates an exact predicted image, thereby significantly reducing a code amount required for encoding a predictive residual and thus reducing the total code amount required per block.

Moreover, since an object is spatially continuous, it is highly probable for the same object as that of an adjacent pixel to be captured in each pixel. In this regard, when encoding an object map expressing the type of an object, an object in each pixel of an object map for a block is predicted with reference to an object map used when encoding a peripheral block or the presence probability of an object is controlled, so that it is possible to reduce a required code amount.

Furthermore, according to the present invention, an object pixel value used when encoding an encoded block around a block may be compared with the object pixel value set in (2), a substitution matrix in which an object identifier used when encoding the encoded block around the block is replaced with the object identifier used in (3) may be generated, and in the step of setting the reference object map in (4), an object identifier in the object map used when encoding the encoded block around the block may be replaced using the generated substitution matrix, so that the reference object map may be generated. An object corresponding to the object identifier used in the reference object map is matched with an object corresponding to the object identifier used in the object map, so that it is possible to correctly use a spatial correlation in the object map even when there are different objects between blocks.

Furthermore, according to the present invention, a decoded image obtained by decoding the code data generated in (7) using the predicted image may be stored, and in the step of setting the reference object map in (4), the object identifier associated in (3) may be allocated to an object pixel value nearest to a pixel value of each pixel using the decoded image stored for the encoded block around the block, so that the reference object map may be generated. In the case of using no object map when encoding a peripheral block, it is possible to generate the reference object map by assigning an object identifier to the peripheral block using an object pixel value for an encoding target block, and to efficiently encode an object map using a correlation for the presence of an object between blocks.

Furthermore, according to the present invention, a method for dividing a block may be set using edge information on the reference object map, an object map may be converted to an object map expressed by a tree structure according to the division method, and in the step of encoding the object map in (6), the object map expressed by the tree structure may be encoded using the reference object map. The division method is decided according to a distribution of objects in the peripheral block, so that it is possible to construct a tree structure using a spatial correlation and to perform encoding with a smaller code amount.

In the decoding process of the present invention, the following processes are performed.

(1) The number of objects in a block is set as an object number. In the setting of the object number, there are a case of setting an object number obtained by decoding code data, and a case of setting an object number using only decoded information in a peripheral block and the like. The case of performing no decoding from the code data, for example, includes a case of setting a predetermined object number or a case of setting the object number by predicting it from image information or an object number of a decoded block around a block. In addition, the decoding of the object number includes a case of decoding the object number from the code data, and a case of generating a predicted value using only decoded information in a peripheral block and the like and decoding only a difference value with the predicted value from the code data.

(2) One object pixel value is set for each object identifier. In the setting of the object pixel value, there are a case of setting an object pixel value obtained by decoding the code data, and a case of setting an object pixel value using only the decoded information in the peripheral block and the like. The case of performing no decoding from the code data, for example, includes a case of setting the object pixel value by predicting it from image information or an object pixel value of a decoded block around a block. In addition, the decoding includes a case of directly obtaining an object pixel value by decoding the object pixel value, and a case of indirectly obtaining an object pixel value by generating a predicted value using only the decoded information in the peripheral block and the like and decoding a difference value with the predicted value. In order to generate the predicted value, it is possible to use the image information or the object pixel value of the encoded block around the block, and an object pixel value previously decoded in a decoding order in a block being decoded.

(3) An object map, which has been used when decoding the decoded block around the block, is set as a reference object map.

(4) The object map is decoded from code data to be decoded while performing prediction using the reference object map.

(5) A predicted image for the block is generated by assigning the object pixel value to each pixel according to the object map.

(6) An image signal for the block is decoded from the code data using the predicted image.

In this way, it is possible to decode the encoded image by the image encoding.

Furthermore, according to the present invention, an object pixel value used when decoding a decoded block around a block may be compared with the object pixel value set in (2), a substitution matrix in which an object identifier used when decoding the decoded block around the block is replaced with an object identifier for a decoding target block may be generated, and in the step of setting the reference object map in (3), an object identifier in the object map used when decoding the decoded block around the block may be replaced using the generated substitution matrix, so that the reference object map may be generated.

Furthermore, according to the present invention, a decoded image obtained in (6) may be stored, and in the step of setting the reference object map in (3), an object identifier of an object pixel value nearest to a pixel value of each pixel may be allocated to a block around a block using the stored decoded image, so that the reference object map may be generated.

Furthermore, according to the present invention, a method for dividing a block may be set using edge information on the reference object map, and in the step of decoding the object map in (4), an object map expressed by a tree structure may be decoded using the reference object map according to the set division method.

Effect of the Invention

According to the present invention, for an image that has pixel values significantly depending on an object as with a distance image and includes a locally limited number of objects, the type of an object captured in each pixel is predicted for each region obtained through the division of the whole of the image using spatial continuity of the presence of the object, so that it is possible to reduce a code amount of additional information required in image signal prediction using a representative pixel value for each object and information for identifying the type of the object in each pixel, resulting in the achievement of efficient image encoding.

BRIEF DESCRIPTION OF THE DRAWINGS

FIG. 4 is a diagram illustrating an example of an object map.

EMBODIMENTS FOR CARRYING OUT THE INVENTION

Figure 1:
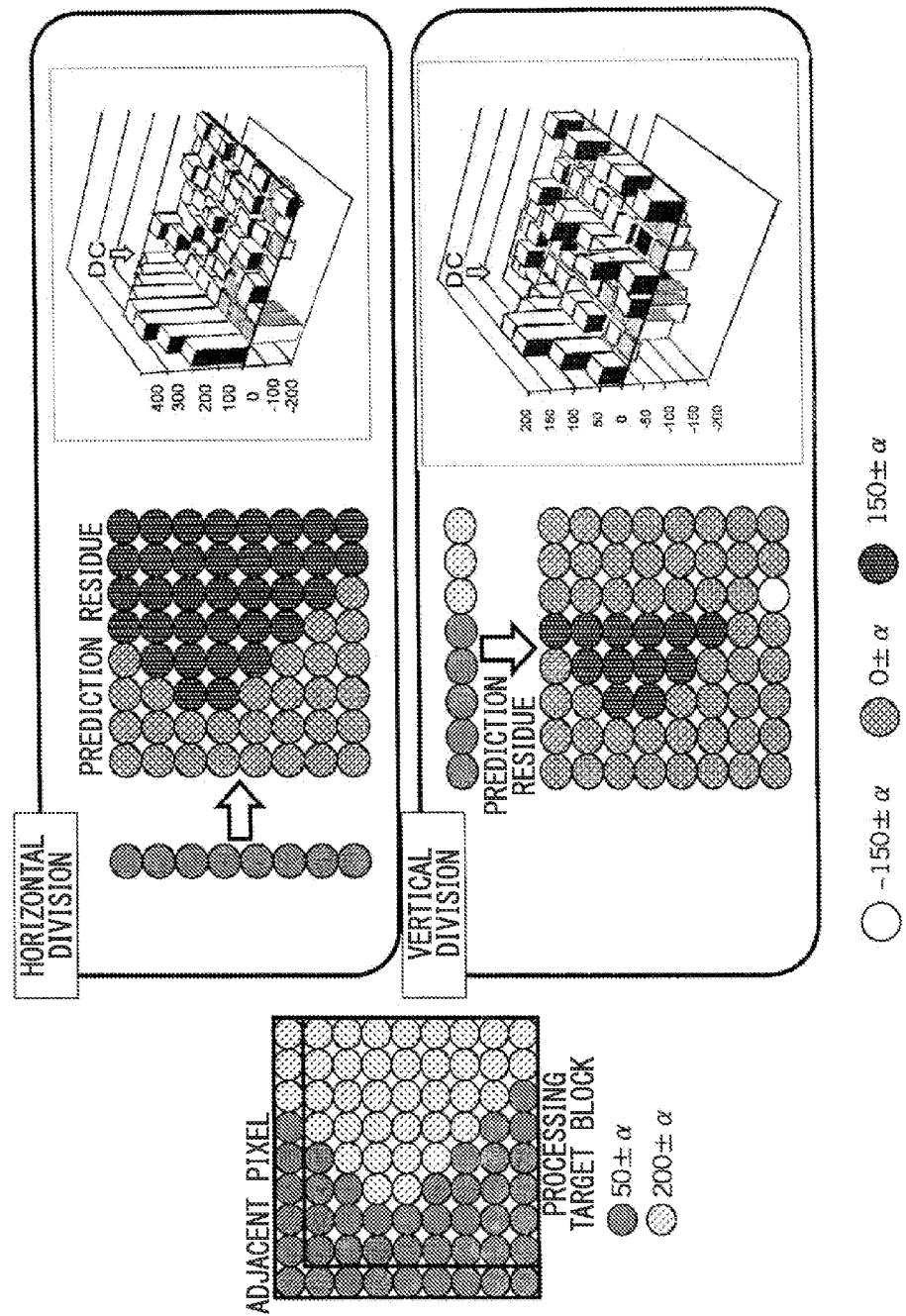
FIG. 1 is a diagram for explaining problems to be solved in the present invention.

In order to solve the problems, according to an embodiment of the present invention, when transmitting or accumulating an image, an image frame is divided into processing regions (hereinafter referred to as blocks) with a predetermined size, and in image encoding for performing encoding while predicting a pixel value of each pixel for each block, it is assumed that there are a fixed number of objects in a block or a variable number of objects in each block, and an image of each block is expressed with information such as a "pixel value (hereinafter referred to as an object pixel value) representing each object" and "object identification information of each pixel." That is, one type of object identification information indicating an object is allocated to one pixel in the block, and one object pixel value is associated with the one type of object identification information. Based on the information, the most similar value is allocated to each pixel, so that it is possible to generate a predicted image holding a complicated edge shape. In addition, since the number of objects included in the block is limited to a small number, the amount of the information is limited.

The object described herein does not indicate an individual object or person that has been captured, and is an object with information, for example, a region having a similar image signal (luminance, color, depth and the like). That is, even in the case of a single object, when the single object has different colors according to places, it is regarded as a plurality of objects. Furthermore, objects in which it is not necessary to encode an image signal, or some of such objects, are not regarded as the object. That is, the object has no relationship to an actual object (an object) in a frame, and an actual object with no information is not the object described in the present invention. Furthermore, when two types of information are assigned to one actual object, the actual object is treated as separate objects.

Terms used in the present invention and embodiments thereof will be described.

"Object number": The object number indicates the number of "objects" in a block and indicates the number of "objects" with information. The object number may be generated by analyzing pixel values in the block. For example, pixels in the block are clustered using information such as pixel values or positions, and a maximum value of a cluster number in which an evaluation value (for example, variance of pixel values) of each cluster is equal to or less than a constant value may be used as the object number. Furthermore, it may be possible to use a value applied from an exterior based on an experience and the like, or a predetermined value. The object number is used to express the number of object pixel values, which is additional information. Furthermore, the object number is also used to express a maximum value of an object identifier to be registered in an object map.

"Object pixel value": The object pixel value is one value defined for the "object," and is a pixel value representing the "object." As the pixel value, a luminance value, a color difference value, an R value and the like may be used. Furthermore, there is also a case of using a set of a plurality of color component values such as RGB values. The object pixel value is generated by analyzing pixel values in the block. In detail, the object pixel value is obtained by clustering pixels in the block into clusters of "the object number" by information such as pixel values or positions, and calculating an average value or a center value for pixel values of included pixels for each cluster. Object pixel values corresponding to "objects" of the pixels in the block are allocated to the pixels, so that the object pixel values are used to generate a predicted image of the block.

"Object map": The object map indicates a "object" in each pixel in the block. In detail, the object map is obtained by expressing each pixel by an object identifier associated with the "object" (the object pixel value). The object map may be expressed as two-dimensional information in the simplest expression, but may also be expressed using a tree structure. The object map is generated by assigning, to each pixel in the block, an object identifier corresponding to an object pixel value nearest to a pixel value of each pixel. In addition, the object map is also generated in consideration of the number of bits necessary for expressing the object map itself as well as the degree of similarity of the pixel values and the object pixel values. The object map is used to indicate an allocated object pixel value for each pixel in the block when generating a predicted image.

"Additional information": Information used in order to predict an image (a video) signal of a frame to be processed in the present invention is called additional information. The additional information is generated in units of blocks to be processed. The additional information basically includes three types of information of the number of objects, the object pixel value, and the object map.

In the present invention, when performing encoding while dividing an entire image and predicting an image signal for each region, using a property indicating that an object has a certain volume for the size of a pixel and exists spatially and continuously, the type of an object captured in each pixel in a processing region is predicted from information on the type of the object in each pixel of an already processed region around the processing region. In this way, it is possible to reduce a code amount required for encoding "information for identifying the type of an object of each pixel in the processing region" required when performing highly accurate image signal prediction with high accuracy corresponding to an arbitrary object shape using a pixel value representing each object in the processing region and information for identifying the type of the object of each pixel in the processing region, resulting in the achievement of efficient image encoding.

Hereinafter, an embodiment of the present embodiment will be described with referenced to the accompanying drawings.

Figure 2:
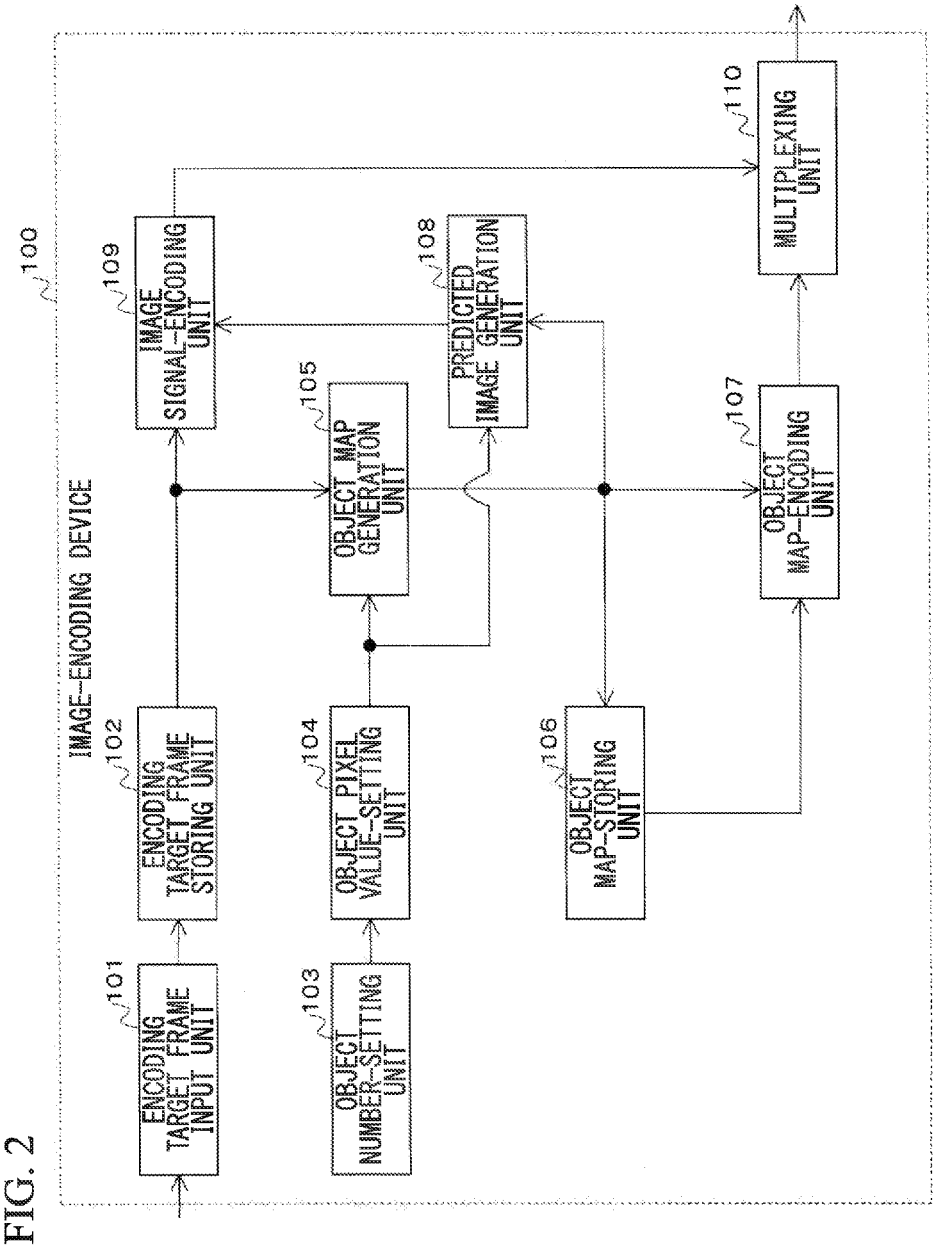
FIG. 2 is a block diagram illustrating a configuration example of an image-encoding device according to a first embodiment of the present invention.

[First Embodiment]
(Image-encoding Device)
First, the first embodiment will be described. FIG. 2 is a block diagram illustrating a configuration example of an image-encoding device according to the first embodiment of the present invention. As illustrated in FIG. 2, an image-encoding device 100 includes an encoding target frame input unit 101, an encoding target frame storing unit 102, an object number-setting unit 103, an object pixel value-setting unit 104, an object map generation unit 105, an object map-storing unit 106, an object map-encoding unit 107, a predicted image generation unit 108, an image signal-encoding unit 109, and a multiplexing unit 110.

The encoding target frame input unit 101 receives encoding target image frames. The encoding target frame storing unit 102 accumulates the received image frames. The object number-setting unit 103 sets the number of objects included in the processing region with a predetermined size. The object pixel value-setting unit 104 sets an object pixel value for each object on the assumption that there are a predetermined number of objects in the processing region.

The object map generation unit 105 generates an object map for the processing region. The object map-storing unit 106 accumulates used object maps. The object map-encoding unit 107 encodes the object map for the processing region. The predicted image generation unit 108 generates a predicted image for the processing region from the object pixel value and the object map generated for the processing region. The image signal-encoding unit 109 encodes an image signal of an encoding target frame using the predicted image for each processing region. The multiplexing unit 110 multiplexes and outputs encoded data of the object map and encoded data of the image signal of the encoding target frame.

Figure 3:
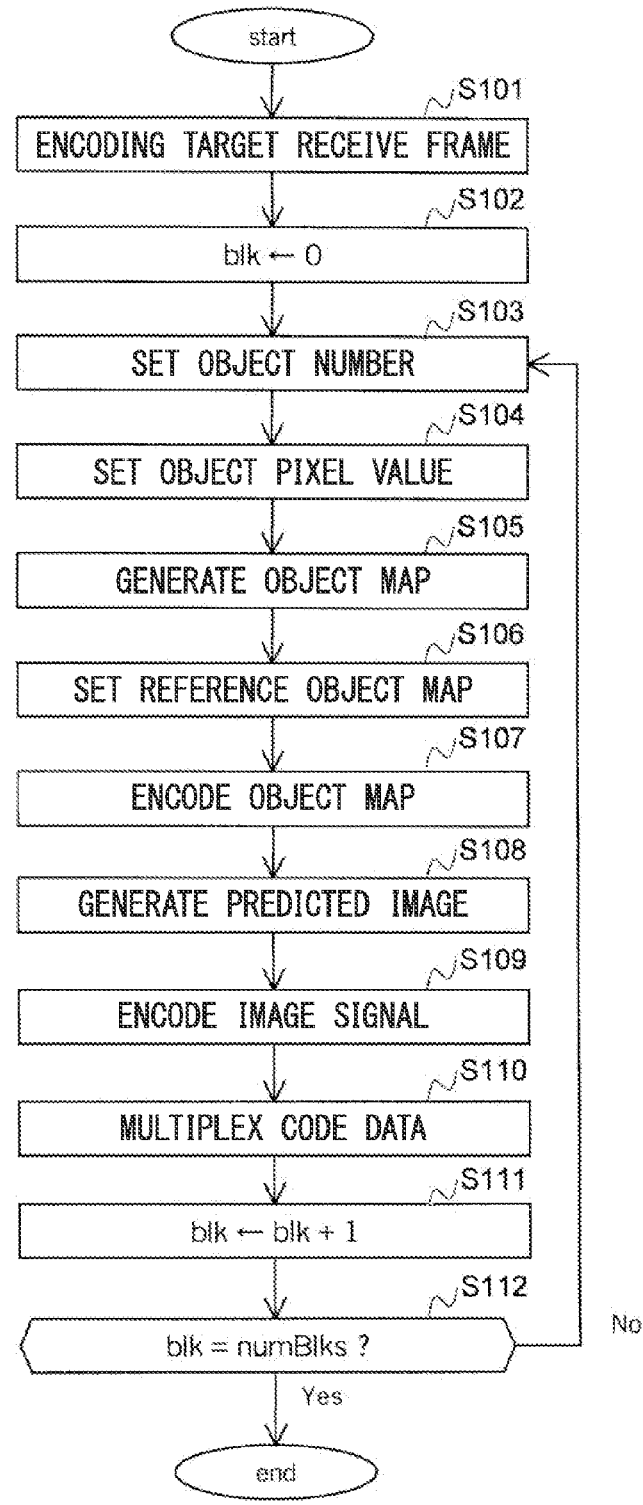
FIG. 3 is a processing flowchart of an image-encoding device according to a first embodiment.

FIG. 3 is a flowchart for explaining an operation of the image-encoding device 100 according to the first embodiment. With reference to the flowchart, processes performed by the image-encoding device 100 will be described in detail.

First, encoding target frames are input to the encoding target frame input unit 101, and are stored in the encoding target frame storing unit 102 (step S101). After the encoding target frames are stored, the encoding target frames are divided and image signals of the encoding target frames are encoded in divided regions (steps S102 to S112). That is, when an index of an encoding target block is indicated by blk and the total number of encoding target blocks is indicated by numBlks, the blk is initialized to 0 (step S102), and then the following processes (steps S103 to S110) are repeated until the blk is the numBlks (step S112) while adding 1 to the blk (step S111).

In a process repeated for each encoding target block, first, the object number-setting unit 103 sets the number numObjes of objects included in the block blk (step S103). The number of objects may be decided using any processes that are the same as those of a decoding side. For example, a predetermined number may always be set.

Furthermore, different values may be set as the object number for each encoding target block. As a method for setting different values for each encoding target block, there is a method for setting the object number according to pixel values of an encoding target block. In detail, as a result obtained by clustering pixels of the encoding target block by a clustering technique such as a k-means method or affinity propagation such that a pixel value variation in each cluster is equal to or less than a predetermined value, a minimum cluster value may be used as the object number. As a scale used in the clustering, only a pixel value may be used or a value including the pixel value and a pixel position may also be used. According to another method, for each candidate of the object number, a rate distortion cost provided by a weighted sum of a code amount and a distortion amount when the object number is set and encoded is calculated, and an object number in which the cost is minimum is set.

According to another method, the object number is set using information on already encoded blocks around the encoding target block. In detail, there are a method in which an average value or a center value of the object numbers set when encoding a plurality of predetermined peripheral blocks is set as the object number of the encoding target block, or a method in which the aforementioned clustering technique is applied to an already encoded pixel group around the encoding target block, and a minimum cluster value based on a clustering result in which a pixel value variation in each cluster is equal to or less than a predetermined value is set as the object number of the encoding target block.

When setting different object numbers for each block, there is a case in which encoding efficiency is reduced if the object number is large. In this regard, a maximum value of the object number may be decided in advance, and the object number may be prevented from being equal to or more than a constant value.

In addition, in the case of setting the different object numbers for each block using information on pixel values and the like of pixels of the encoding target block, it is necessary to encode the object number and put the encoded object number into code data to be output. In the case of encoding the object number, a preset object number may be encoded as is, or a difference value with an object number predicted using information on pixel values and the like of already encoded blocks around the encoding target block may be encoded.

In the case of encoding the object number, the object number is not encoded for each block, and may be set and encoded for each set of a plurality of blocks called a frame or a slice. In this way, when the object number changes dependent on a region, it is possible to efficiently encode the object number. In addition, it may be possible to combine the setting and encoding of the object number in units of frames or slices and the setting and encoding of the object number for each block. In this case, in units of frames or slices, the object number considered to be appropriate for most of a plurality of blocks included in the frame or slice is set and encoded, and a change amount from the object number is set and encoded for each block. The change amount that is set and encoded for each block may be predicted using information on an already encoded adjacent region, and may be encoded as a predicted difference of the change amount.

After the object number is set, the object pixel value-setting unit 104 sets one pixel value for each object in the block blk, and uses the pixel value as an object pixel value Value (i) (step S104). Here, i is an object identifier for identifying objects and is an integer that is equal to or more than 0 and smaller than numObjs. Furthermore, the object identifier is allocated according to a predetermined rule. Here, it is assumed that the value of i of the object identifier is allocated in ascending order of the object pixel value.

As a method for setting one pixel value for each object, any method may be used. For example, a range of a pixel value may be uniformly quantized by the object number and a center value of each range may be set. According to another method, the pixels of the block blk are divided into numObjes clusters using the aforementioned clustering technique, and an average value or a center value of pixel values of pixels included in each cluster is used as the object pixel value. In addition, in the case of setting the object number, when the pixels of the block blk are clustered, the object number and the object pixel value may be simultaneously set.

According to further another method, the pixels are divided into numObjes clusters or less, that is, a minimum number of clusters in which a maximum value of a pixel value variation value in the cluster is smaller than a separately decided threshold value, an average value or a center value in each cluster is set as the object pixel value, and the object pixel value is appropriately set for fewer clusters than numObjes clusters. In the case in which the object number is always constant, even when there is originally only a single object, it is assumed that there are a plurality of objects, resulting in the probability that excessively highly accurate prediction is provided and a code amount of an object map, which will be described later, is increased. However, a threshold value is decided in response to a target bit rate and an object identifier is decided regardless of the numObjs, so that it is possible to prevent a code amount from being exceeded.

According to still another method, setting is performed using the object pixel value used when encoding an already encoded block around the encoding target block. In detail, there are a method in which an average value or a center value of object pixel values allocated to the same object identifier in peripheral blocks is set as the object identifier of the encoding target block, or a method in which a set of object pixel values used in the peripheral blocks is obtained and divided into the numObjs clusters, and an average value or a center value in each cluster is set as the object identifier of the encoding target block.

According to still another method, setting is performed using pixel values for already encoded pixels around the encoding target block. In detail, there is a method in which an already encoded pixel group around the encoding target block is divided into numObjs clusters using the aforementioned clustering technique and an average value or a center value of pixel values of pixels included in each cluster is set as the object pixel value.

In addition, in the case of setting the different object pixel values for each block using information on pixel values and the like of pixels of the encoding target block, it is necessary to encode the object pixel value and put the encoded object pixel value into coded data to be output. In the case of encoding the object pixel value, a preset number of object pixel values may be encoded as is, or a difference value with the object pixel value predicted using information on pixel values and the like of already encoded blocks around the encoding target block may be encoded.

After the object pixel values are obtained, the object map generation unit 105 generates an object map for the block blk (step S 105). The generated object map is associated with block positions and is stored in the object map-storing unit 106, and is sent to the object map-encoding unit 107. The object map is obtained by assigning the object identifier to each pixel of the block blk. For example, the object map is two-dimensional information as illustrated in FIG. 4. FIG. 4 illustrates object identifiers having values of 0, 1, and 2 allocated to respective pixels.

According to a method for assigning the object identifier to each pixel, an object identifier having an object pixel value nearest to the pixel value of each pixel is allocated to each pixel. Furthermore, according to another method, in the case of performing clustering when setting the object pixel value, an object identifier allocated to each cluster is set to a pixel belonging to the cluster using a result of the clustering.

According to still another method, a plurality of object map candidates are generated, a rate distortion cost provided by a weighted sum of a code amount and a distortion amount when encoding is performed using the object map candidate is calculated for each object map candidate, and a minimum rate distortion cost is set as the object map. In this case, all probable object maps may be set as the object map candidates, or only a few restricted distinctive object maps may be set as the object map candidates. The distinctive object map includes an object map generated by assigning, to each pixel, an object identifier having an object pixel value nearest to the pixel value of each pixel, an object map in which all pixels have the same object identifier, or an object map divided horizontally and vertically.

Next, the object map used when encoding the already encoded block around the encoding target block and stored in the object map-storing unit 106 is set as a reference object map (step S106). The reference object map may be selected using any methods that are the same as those of a decoding side. For example, the reference object map may be set as an object map for a block group having a predetermined positional relationship, or information indicating a selection method for each unit of a frame or a block group may be encoded and set as a part of coded data. According to a detailed example, a set of object maps for blocks positioned at the upper side, the left side, and the left upper side of the encoding target block is set as the reference object map.

Next, the object map-encoding unit 107 encodes the generated object map using the reference object map (step S107). In the case of encoding two-dimensional map information, there are a method in which object identifiers of pixels are encoded in a raster scan order or a zigzag scan order, and a method in which the object map is converted into data with a tree structure such as a quadtree or a binary tree and then information of each node is encoded in a scan order based on depth first search or breadth first search.

Figure 5:
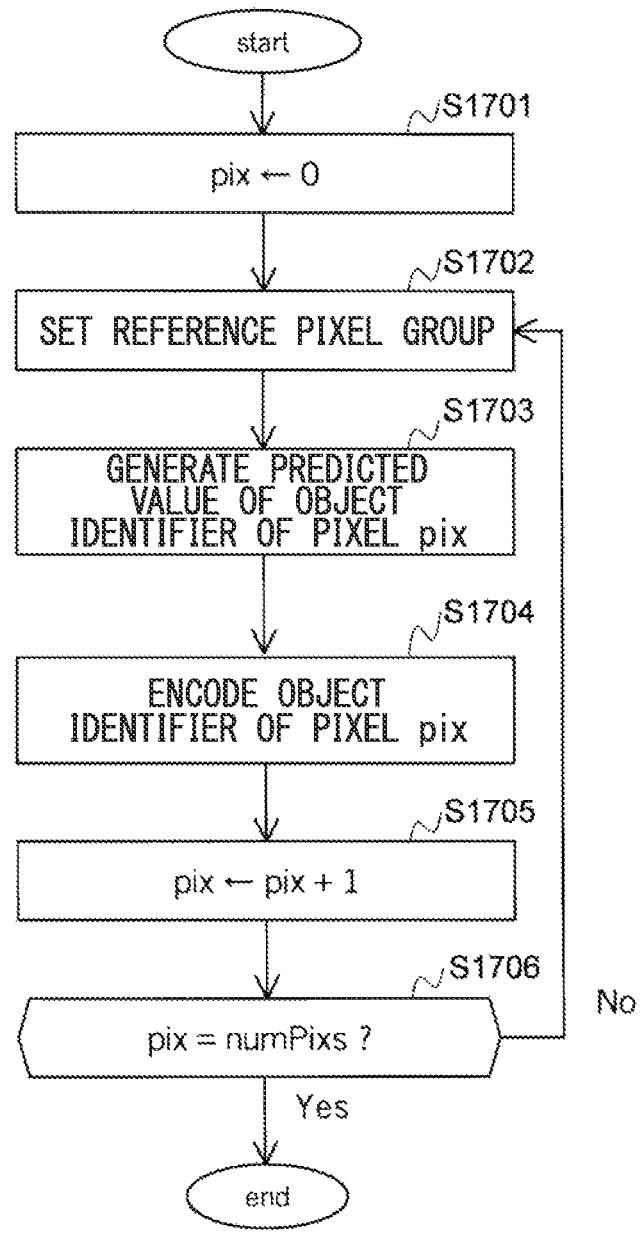
FIG. 5 is a flowchart of a process of encoding an object identifier of each pixel.

A process when the object identifiers of the pixels are encoded in a raster scan order or a zigzag scan order will be described in detail with reference to the flowchart of FIG. 5. Since the process herein is performed for each pixel in the encoding target block, when an index of a pixel in the encoding target block is indicated by pix and the number of pixels in the encoding target block is indicated by numPixs, pix is initialized to 0 (step S1701), and then the following processes (steps S1702 to S1704) are repeated until pix is numPixs (step S1706) while adding 1 to the pix (step S1705).

In a process repeated for each pixel, first, a pixel group around the pixel pix is set as a reference pixel group (step S1702). The reference pixel group is selected from a pixel group in the reference object map or a pixel group having an index value smaller than pix. The reference pixel group may be selected using any methods that are the same as those of a decoding side. For example, the reference pixel group may be set as a pixel group having a predetermined positional relationship, or information indicating a selection method for each unit of a frame or a block group may be encoded and sent to the decoding side. Here, it is assumed that a pixel group adjacent to the pixel pix at the upper side, the left side, and the left upper side of the pixel pix is set as the reference pixel group.

Next, a predicted value of the object identifier of the pixel pix is generated from an object identifier for the reference pixel group (step S1703). In relation to the generation of the predicted value, there are a case in which one object identifier is generated, a case in which the occurrence probability of each object identifier is generated, and a case in which both of the one object identifier and the occurrence probability of each object identifier are generated. A predicted value to be generated is decided according to the following encoding method.

According to a method for generating the one object identifier as the predicted value, an object identifier appeared with the highest frequency in the reference pixel group is set as the predicted value. In addition, when there are a plurality of object identifiers appearing with the highest frequency, one object identifier is selected according to a predetermined rule. For example, there are methods in which object identifiers are ranked according to sizes and the like thereof, or in response to a positional relationship for the pixel pix.

According to a method for generating the occurrence probability of each object identifier, it is assumed that the occurrence probability is high when the appearance frequency in the reference pixel group is high. Furthermore, it is necessary to prevent the occurrence probability of an object identifier that does not appear only once from being zero. In addition, an occurrence probability difference according to the appearance frequency may be fixed or changed. According to a method for changing the occurrence probability difference, probability tables that are different according to the states of object identifiers for the reference pixel group are prepared, initialization is performed at the time of start of encoding, and a used probability table is updated based on data encoded when encoding one object pixel value. In this case, since the method is performed corresponding to even a local change while changing a probability table over a plurality of blocks, it is possible to reliably predict the occurrence probability even when there is an outlier. In addition, in order to allow the code data to have random accessibility, it is necessary to re-initialize the probability table at a proper interval.

According to a method for generating both of the one object identifier and the occurrence probability, two processes may be performed independently, or after the occurrence probability is generated, an object identifier with the highest occurrence probability is searched, so that information on both of them may be generated.

After the predicted value is generated, the object identifier for the pixel pix is encoded using the predicted value (step S1704). When one predicted object identifier has been provided, binary information indicating whether the prediction is correct is first encoded. Next, the object identifier for the pixel pix is encoded only when the prediction is not correct. When the occurrence probability has been provided, the object identifier for the pixel pix is entropy-encoded according to the probability. For the entropy encoding, it is possible to use arithmetic coding, Huffman coding and the like. When the information on both of them has been provided, binary information indicating whether the prediction is correct is first encoded. Then, when the prediction is not correct, the object identifier for the pixel pix is entropy-encoded according to the provided occurrence probability. In addition, when changing the occurrence probability in response to an encoding history, after the object identifier for the pixel pix is encoded, the used probability table is updated in response to the encoded object identifier.

Figure 6:
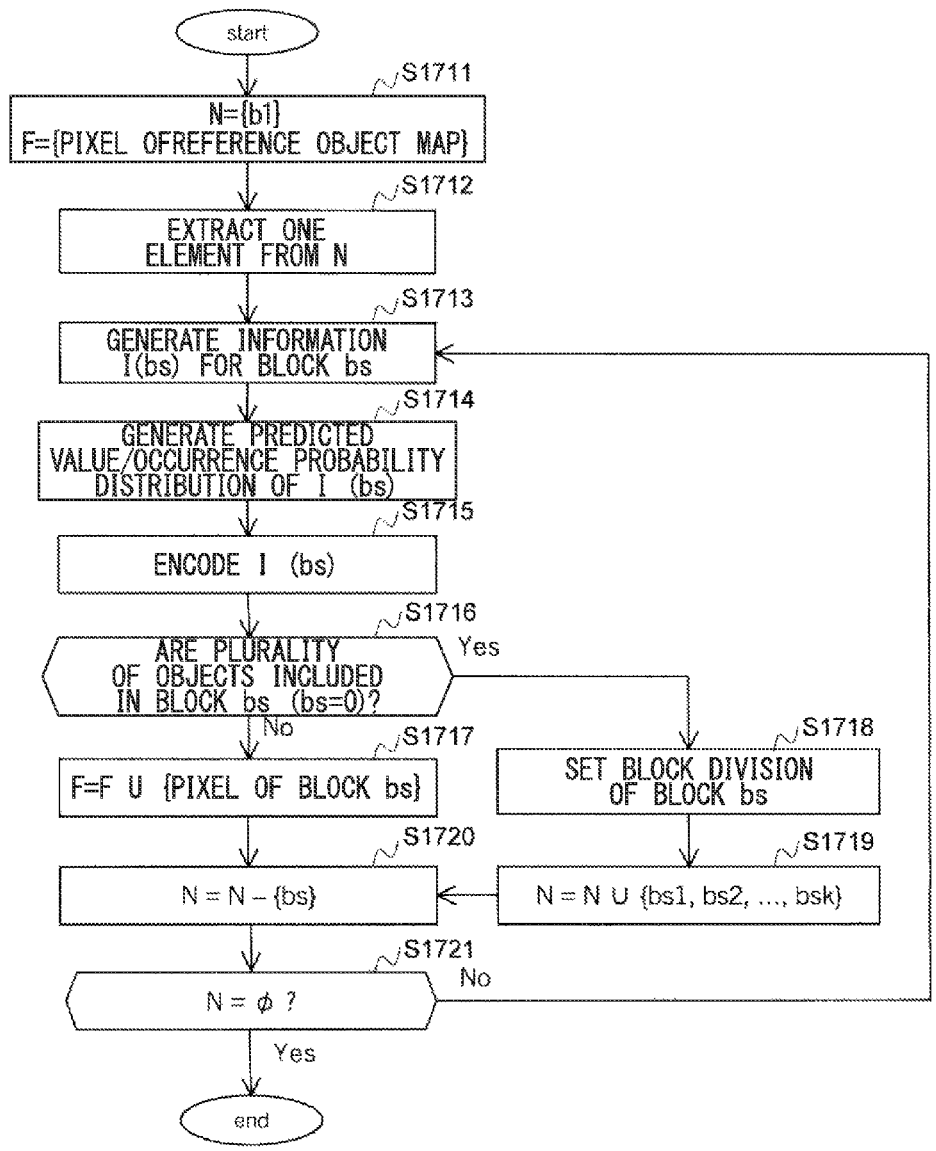
FIG. 6 is a flowchart of a process of encoding a tree structure object map.

With reference to the flowchart of FIG. 6, a detailed description will be provided for a process when encoding the information on each node in the scan order of the depth first search after the object map is converted into data with a tree structure in the case of encoding the object map. In addition, the data with a tree structure corresponds to two-dimensional information expressed by setting the block blk as a root, setting a plurality of sub-blocks obtained by dividing a block of a parent node to correspond to child nodes of each node, and assigning information on corresponding regions to the nodes. Using the tree structure expression, it is possible to efficiently express a pixel set of single objects collectively present, resulting in the improvement of encoding efficiency.

In addition, the data with a tree structure may be arbitrarily defined. For example, binary information indicating whether object identifiers of all pixels in a block corresponding to each node are equal to one another is added to each node, and leaves (terminal nodes), which have numbers of all the object identifiers when the object identifiers are equal to one another, or nodes which correspond to sub-blocks generated by dividing its own block by a predetermined method when all the object identifiers are not equal to one another are defined as the child nodes, so that it is possible to generate information on a tree structure. In addition, in the case of using this definition, when a corresponding block is one pixel, it is possible to omit a node having the binary information indicating whether the object identifiers of all pixels are equal to one another.

Figure 7:
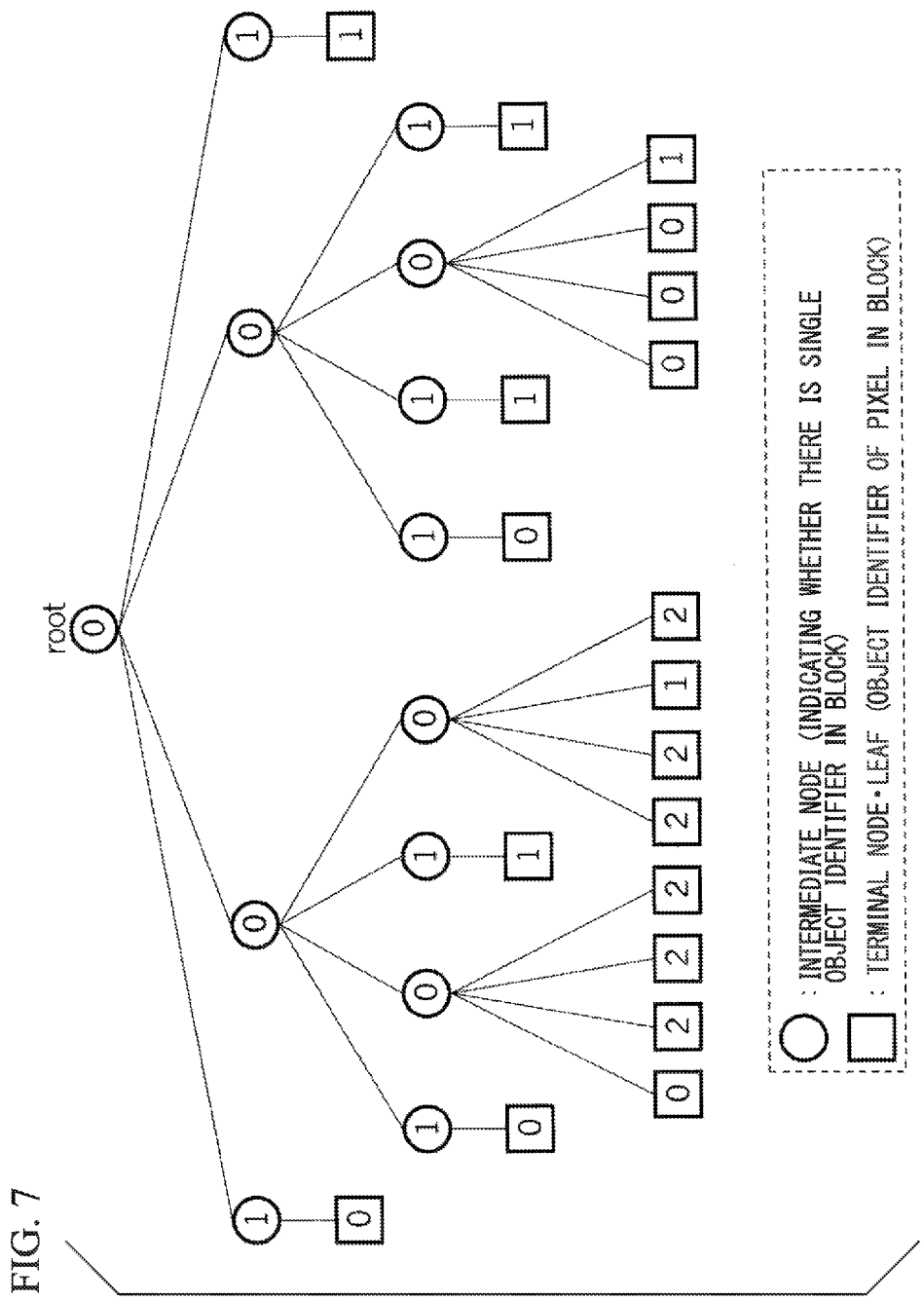
FIG. 7 is a diagram illustrating an example of a tree structure object map.

An example of the data with a tree structure (an object map with a tree structure) generated as described above for the object map of FIG. 4 is illustrated in FIG. 7. This example corresponds to an expression based on quadtree in which, in block division, a block is uniformly divided in the vertical and horizontal directions.

Figure 8:
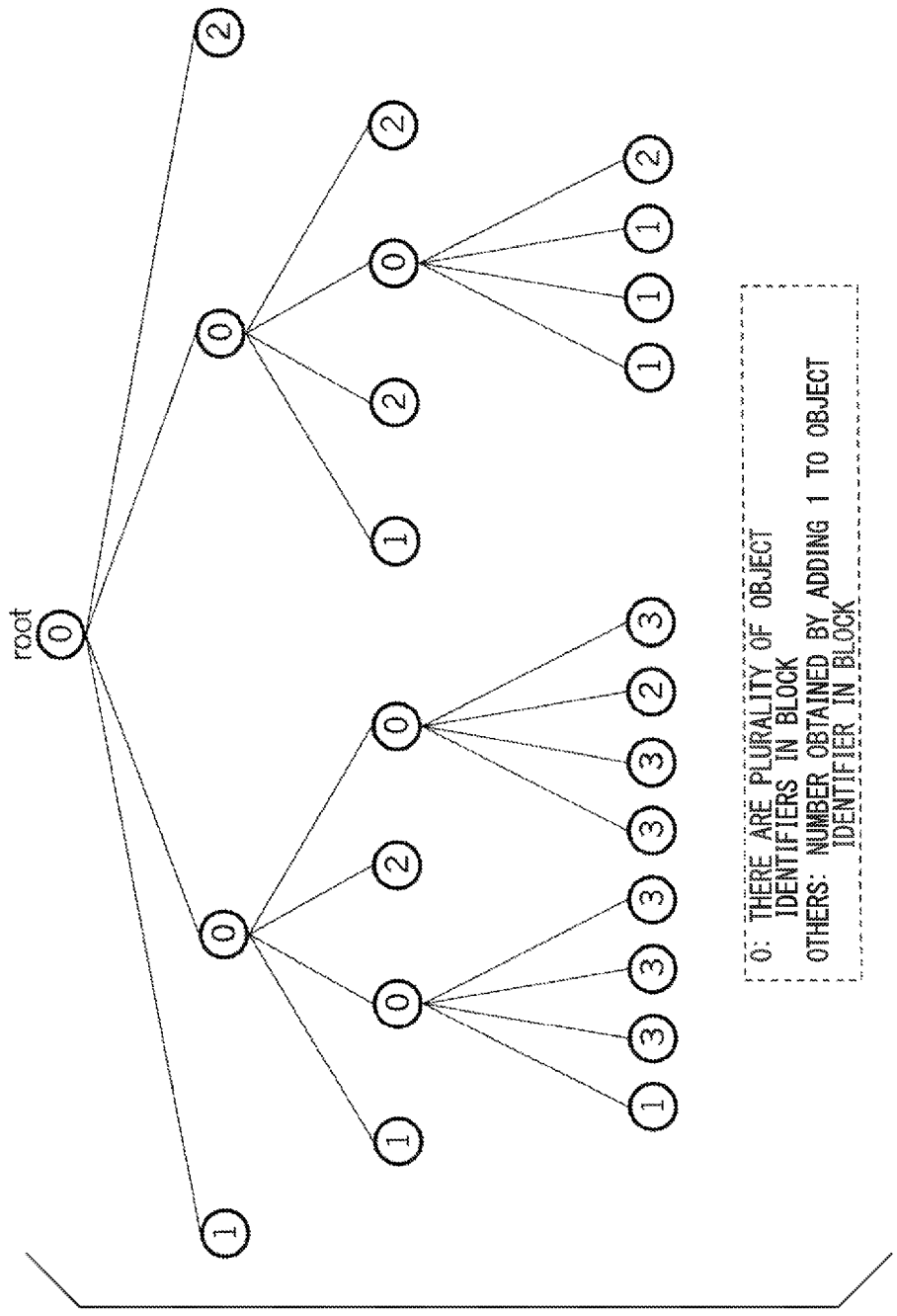
FIG. 8 is a diagram illustrating an example of a tree structure object map.

Each node may be defined in a separate method. For example, for each node, when the object identifiers of all pixels in the block corresponding to each node are equal to one another, a number obtained by adding 1 to the number of the object identifiers is assigned as information, and otherwise, 0 is assigned as information. Then, a child node is defined for sub-blocks obtained by dividing only a node having the information 0. For the object map of FIG. 4, an object map with a tree structure generated using this definition and block division based on uniform division in the vertical and horizontal directions is illustrated in FIG. 8.

According to a process of encoding the object map through conversion to the data with a tree structure, generation and encoding of node information on blocks are performed starting from the encoding target block, and the same process is recursively performed for sub-blocks generated by dividing the block according to necessity, so that the object map is encoded. That is, when a set of non-processed blocks is indicated by N, a set of processed pixels is indicated by F, and the block blk is indicated by b1, after N is initialized to {b1} and F is initialized to a set of pixels included in the reference object map (step S1711), the following processes (steps S1712 to S1720) are repeated until N is an empty set (step S1721).

In the process that is repeated until N is an empty set, one block is first extracted from N (step S1712). At this time, a block to be extracted is decided according to a predetermined rule. When a scan order of a tree is set as depth first search, LIFO (Last In First Out) is applied, that is, a block entered later is first extracted as with a stack. When the scan order is set as breadth first search, FIFO (First In First Out) is applied, that is, a block entered first is first extracted as with a queue. Hereinafter, it is assumed that the extracted block is indicated by bs.

Next, information I (bs) on the block bs is generated (step S1713). Based on the aforementioned example, when object identifiers of all pixels in the block bs are equal to one another, a number obtained by adding 1 to the number of the object identifiers is set as I (bs), and otherwise, 0 is assigned as I (bs).

Next, a predicted value or an occurrence probability distribution of I (bs), or both of them are generated using information on object identifiers for a pixel group F (step S1714). The predicted value and the occurrence probability distribution of I (bs) may be generated using an arbitrary method.

According to the method for generating the predicted value, for example, among object identifiers for a pixel group adjacent to the block bs of pixel groups included in F, an object identifier appearing with the highest frequency and the generation frequency thereof are obtained, a value obtained by adding 1 to the object identifier is set as the predicted value when the generation frequency is equal to or more than a predetermined threshold value, and 0 is set as the predicted value when the generation frequency is smaller than the threshold value. Furthermore, according to another method, when the generation frequency is smaller than the threshold value, 0 is set as a first predicted value, and a value obtained by adding 1 to the object identifier is set as a second predicted value.

According to the method for generating the occurrence probability distribution, for example, the object identifiers for the pixel group adjacent to the block bs of the pixel groups included in F are checked, and the occurrence probability is set in response to the generation frequency of each object identifier. In detail, a probability for 0 is first calculated. Since 0 indicates the case in which the number of object identifiers in the block is not 1, the probability is set to be a large value when a maximum value of the calculated generation frequency is small. Then, remaining probabilities are distributed in response to the generation frequency, so that the probability distribution is generated. Furthermore, except for the case in which a block size is one pixel, the occurrence probability needs to be a value larger than 0 in all values.

In addition, the method for deciding the probability for 0 and the method for performing distribution in response to the generation frequency may be fixed or changed. According to a variable method, probability tables that are different according to the states of the generation frequency, a value of an object, a block size and the like are prepared, initialization is performed at the time of start of encoding, and a used probability table is updated based on data encoded when encoding one value. In this case, since the method is performed corresponding to even a local change while changing a probability table over a plurality of blocks, it is possible to reliably predict the occurrence probability even when there is an outlier. In addition, one probability table may also be used for each of a plurality of states. In order to allow the code data to have random accessibility, it is necessary to re-initialize the probability table at a proper interval.

Furthermore, in the case of generating both of the occurrence probability distribution and the predicted value, both of them may be generated independently, or after the occurrence probability distribution is generated, a value having the highest occurrence probability may be set as the predicted value.

After the predicted value and the occurrence probability distribution of I (bs) are generated, I (bs) is encoded using information on both of them (step S1715). In the case in which the predicted value has been generated in step S1714, binary information indicating whether the predicted value is correct is encoded, and I (bs) is encoded only when the prediction is not correct. In the case in which the predicted value has not been generated, the value of I (bs) is directly encoded. In addition, in the case of encoding I (bs), when the occurrence probability distribution has been generated in step S1714, I (bs) is entropy-encoded according to the probability. In addition, when changing the generation of the occurrence probability distribution in response to an encoding history, after I (bs) is encoded, the used probability table is updated in response to the encoded I (bs).

After I (bs) is encoded, it is checked whether a plurality of objects are included in the block bs (step S1716). The checking methods are changed according to the definition of the data with a tree structure. Here, it is checked whether I (bs) is 0. When I (bs) is not 0, since all pixels included in the block bs have the same object identifier, it is assumed that sufficient information has been provided to the block bs. Accordingly, pixels included in the block bs are added to F (step S1717), and bs is removed from N to complete a process for the block bs (step S1720).

When I (bs) is 0, since an object identifier for each pixel included in the block bs has not been obtained, the block bs is divided to generate small sub-blocks. In the generation of the sub-blocks, block division is first set (step S1718).

The block division may be set using any methods that are the same as those of a decoding side. For example, there is a method for setting predetermined fixed block division. In detail, there is a method for setting block division in which a block is uniformly divided in the vertical and horizontal directions to generate four sub-blocks.

Figure 9:
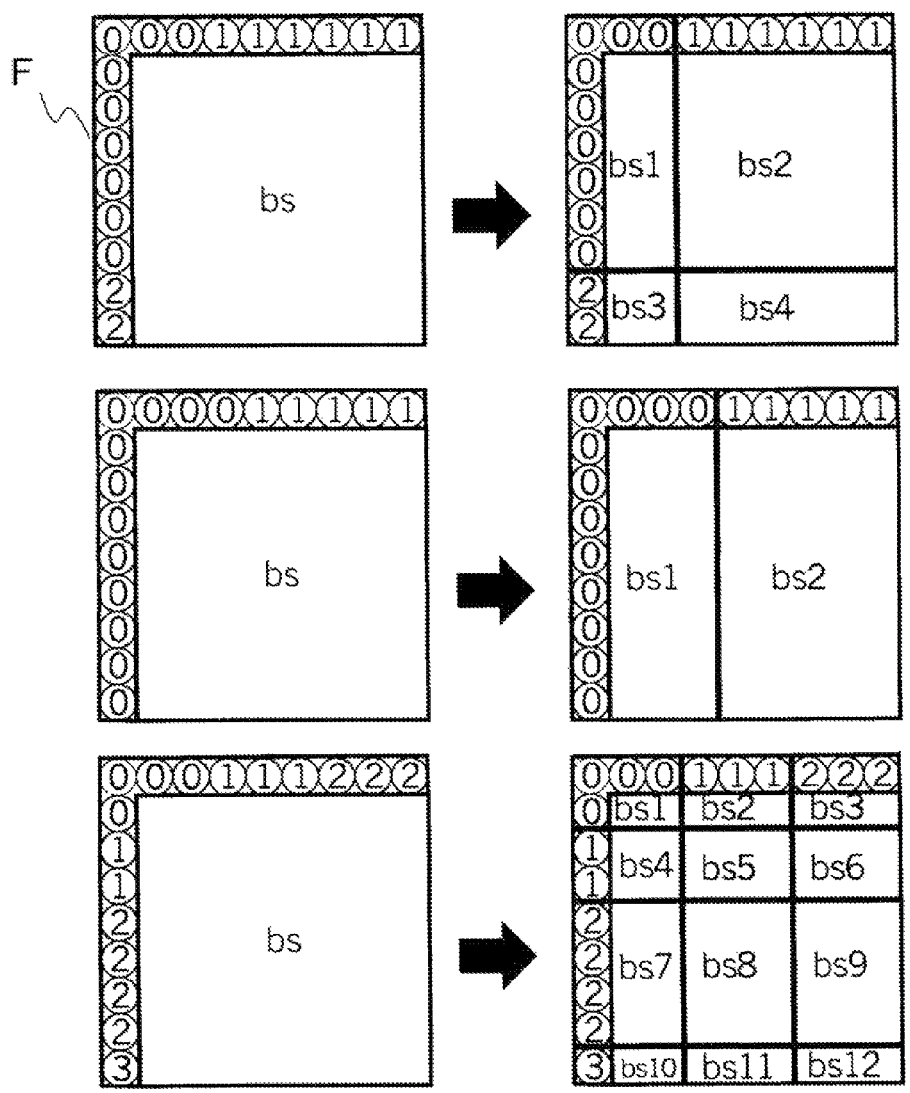
FIG. 9 is a diagram for explaining an example in which variable block division is set using information on an object identifier.
Figure 10:
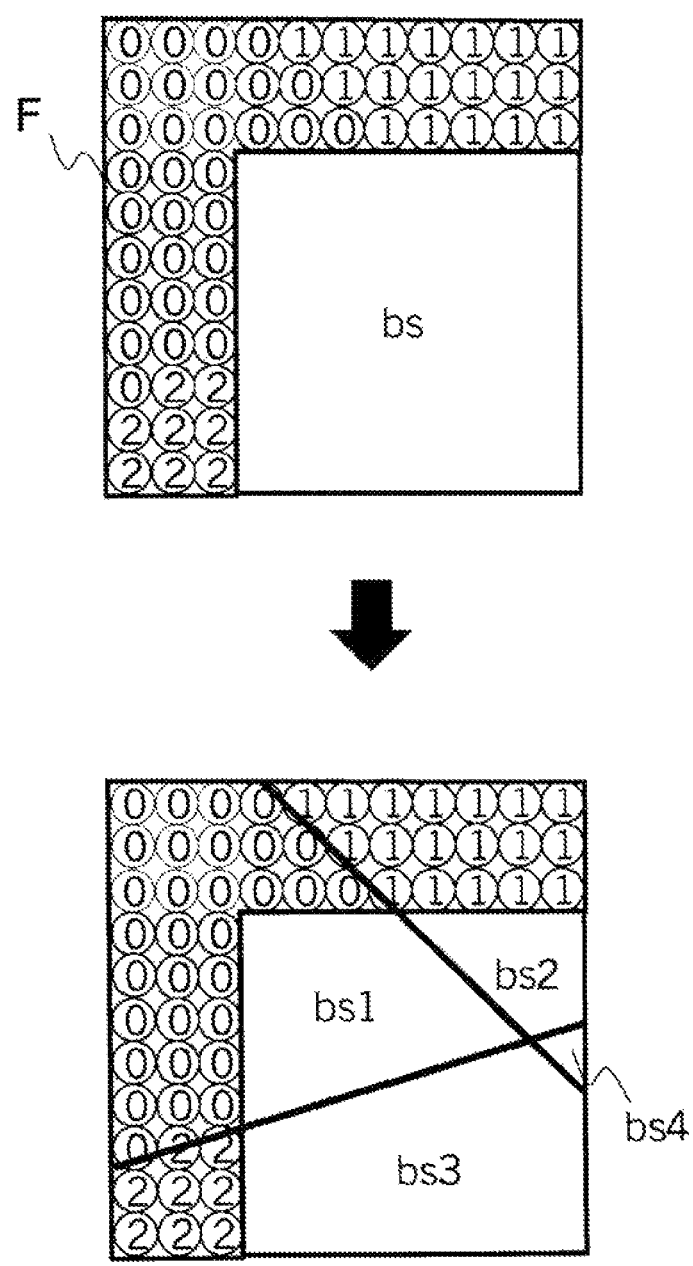
FIG. 10 is a diagram illustrating an example in which block division is set along the direction of an edge.

Furthermore, there is a method for setting variable block division using the information of the object identifiers for the pixel group F. According to the simplest method, the object identifiers for the pixel group adjacent to the block bs of the pixel groups included in F are checked, and the boundary of the sub-block is set in a part having different object identifiers in adjacent pixels included in F. In detail, when object identifiers have been allocated to the pixel group of F as illustrated in FIG. 9, block division is set as illustrated on the right side of FIG. 9. At this time, the number of sub-blocks needs not be fixed. According to a more complicated method, edge information on object identifiers in the pixel group included in F is extracted and block division is set according to a shape in the direction of the edge. In detail, there is a method for setting block division as illustrated in FIG. 10.

After the block division is set, the block bs is divided according to the block division to generate a plurality of sub-blocks. At this time, the generated sub-blocks are scanned in a predetermined order such as a raster scan order or a zigzag scan order, and are added to N in this order (step S1719). Here, the scanned sub-blocks are indicated by bs1, bs2, . . . , bsk. In addition, k denotes the number of generated sub-blocks. Then, bs is removed from N to complete the process for the block bs (step S1720).

After the object map is encoded, the predicted image generation unit 108 generates a predicted image for the block blk using the object map and the object pixel value (step S108). In detail, the predicted image generation unit 108 allocates the object pixel value corresponding to the object identifier obtained from the object map to each pixel, thereby generating the predicted image. In addition, in the case of encoding and transmitting the object pixel value, when the object pixel value has been quantized and then encoded, it is necessary to generate the predicted image using a value obtained through quantization and inverse quantization in a decoding side.

In addition, dither may be further added to the predicted image generated as described above. In the predicted image using the object map and the object pixel value, since there are only pixel values having the same number as that of objects, the predicted image has properties different from those of a natural image. In this regard, dither is added to approximate a natural image. In order to generate the dither, an arbitrary method may be used. However, it is necessary to allow a decoding side to generate the same dither. When a parameter is required for initialization and the like, it is necessary to encode the parameter.

After the predicted image is obtained, the image signal-encoding unit 109 performs predictive encoding of an image signal for the block blk (step S109). For the encoding, any methods may be used. In general encoding of MPEG-2 or H.264/AVC, encoding is performed for a difference signal between an image signal and a predicted image of the block blk by sequentially performing a frequency transform such as a DCT, quantization, binarization, and entropy-encoding.

Lastly, the multiplexing unit 110 multiplexes code data of the object map and code data of the image signal and outputs multiplexed data (step S110). When the object number and the object pixel value have been encoded, code data for the object number and the object pixel value is also multiplexed. Here, multiplexing is performed for each block. However, the multiplexing may be performed in units of frames. In this case, at the time of decoding, code data corresponding to one frame needs to be decoded after buffering.

In addition, when the object number is 1 in a special situation, since there is only one object map, it is sufficient if a unique object map candidate of the object map is set in the object map-setting step, and it is not necessary to encode and multiplex the object map.

Since an object has a spatial size, there is a spatial correlation in the object map indicating the presence and the type of the object. In the present embodiment, since object maps used when encoding the blocks are stored, when encoding an object map of a certain block, prediction is performed from an object map of a peripheral region, so that it is possible to reduce a required code amount using the spatial correlation.

In the case of setting different object numbers and different object pixel values for each block, by the stored object map or an object map to be encoded, the same object may be expressed using different object identifiers. In this case, when the stored object map is used as is, it is not possible to correctly predict an object map of an encoding target block and not possible to achieve code amount reduction using the spatial correlation.

In such a case, after the object pixel values are also stored in addition to the object maps, when setting the reference object map in step S106, an object pixel value used when encoding a block corresponding to each object map is compared with an object pixel value for the encoding target block, an object identifier of the stored object map is converted to an object identifier set for the encoding target block, and the converted object map is set as the reference object map. In this way, a reference object map expressed by the same object identifier is available for the same object, so that it is possible to reduce a code amount of the object map using the spatial correlation. An image-encoding device at this time is illustrated in FIG. 11.

Figure 11:
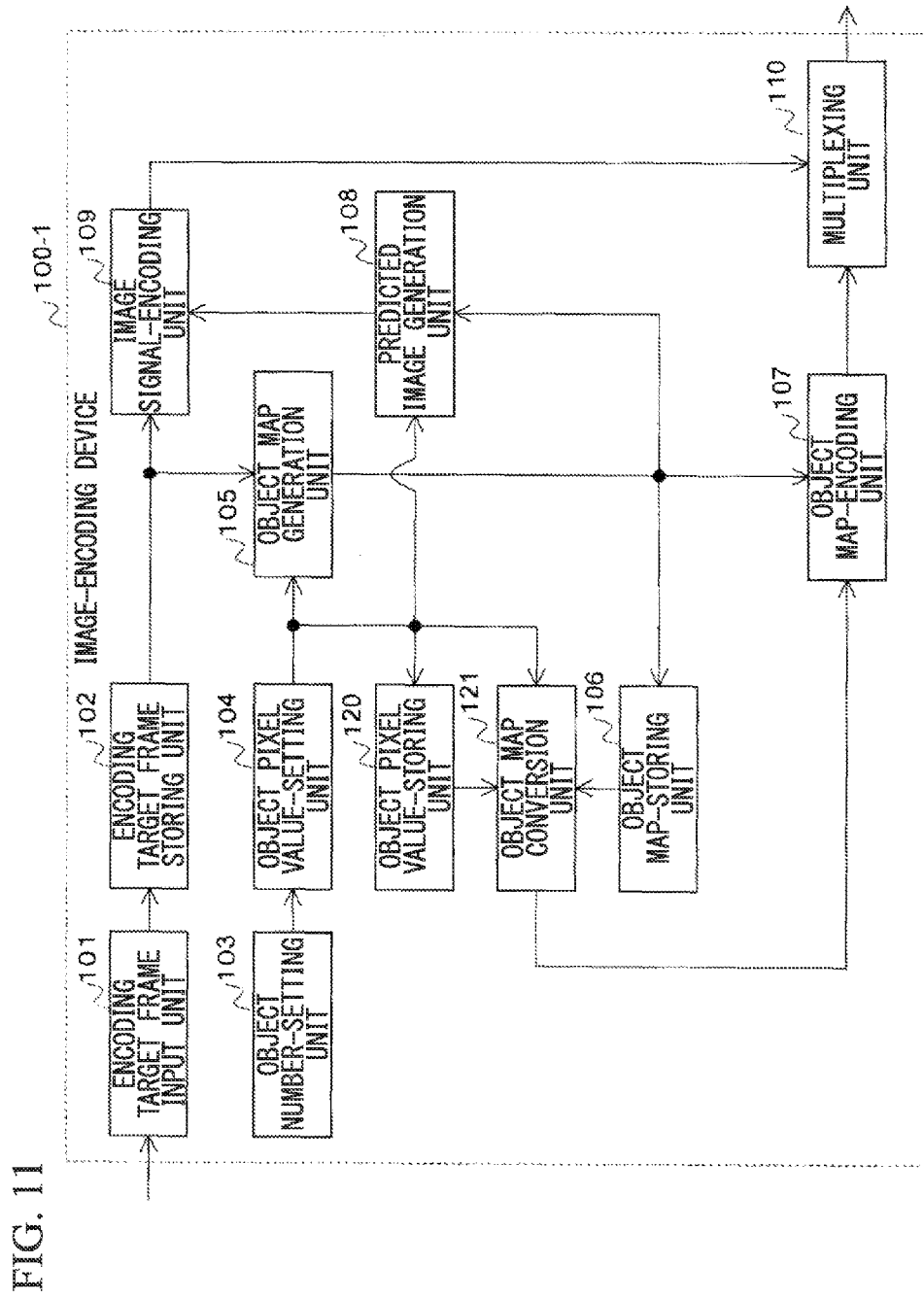
FIG. 11 is a block diagram illustrating another configuration example of an image-encoding device.

In an image-encoding device 100-1 illustrated in FIG. 11, elements having the same reference numerals as those of the elements of the image-encoding device 100 of FIG. 2 have the same functions as those described in FIG. 2. An object pixel value-storing unit 120 stores the object pixel value set by the object pixel value-setting unit 104. An object map conversion unit 121 compares the object pixel value used when encoding the block corresponding to each object map with the object pixel value for the encoding target block in the case of setting the reference object map, generates a substitution matrix in which the object identifier of the stored object map is replaced with the object identifier set for the encoding target block, and converts an object map used when encoding a reference region according to the substitution matrix, thereby generating the reference object map.

Figure 12A:
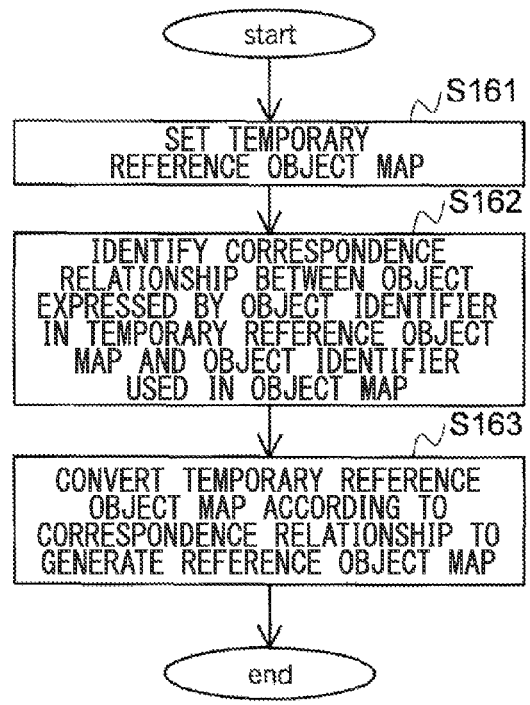
FIG. 12A is a flowchart of a process of setting a reference object map.

In addition, the object identifier may be converted using any methods that are the same as those of a decoding side. For example, according to the simplest method, for each object pixel value in a peripheral block, an object pixel value of an encoding target block nearest to the value is identified, and an object identifier for the object pixel value of the peripheral block is replaced with an object identifier for the identified object pixel value. A detailed process flow in step S106 at this time is illustrated in FIG. 12A.

First, a temporary reference object map is set (step S161). Next, a correspondence relationship between an object expressed by an object identifier in the temporary reference object map and an object identifier used in an object map is identified (step S162). Then, the temporary reference object map is converted according to the correspondence relationship to generate a reference object map (step S163).

Figure 12B:
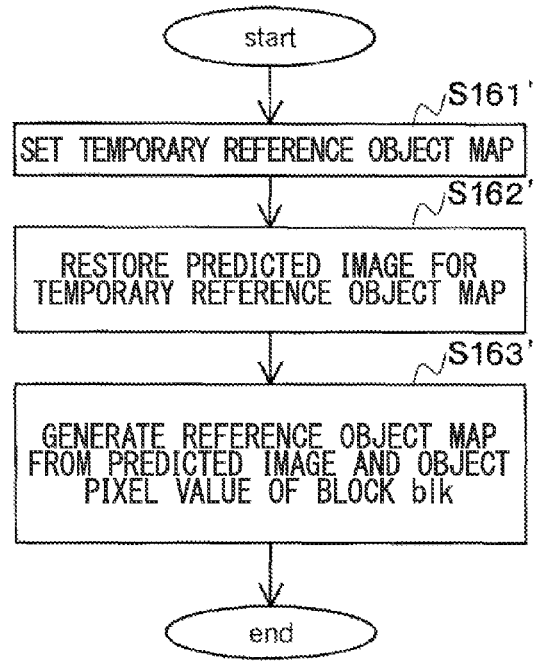
FIG. 12B is a flowchart of a process of setting a reference object map.

According to another method, a predicted image of a peripheral block is generated from an object map and an object pixel value in the peripheral block, and an object identifier having an object pixel value nearest to the pixel value is allocated to each pixel of the predicted image, so that the reference object map is generated. A detailed process flow in step S106 at this time is illustrated in FIG. 12B.

First, a temporary reference object map is set (step S161'). Next, a predicted image for the temporary reference object map is restored (step S162'). The reference object map is generated from the predicted image and the object pixel value of the block blk (step S163'). In addition, in this case, the predicted image is stored instead of the object map or the object pixel value, so that it is possible to omit the process of generating the predicted image.

Furthermore, there is an object that is in the peripheral block but is not in the encoding target block. Therefore, when identifying corresponding object pixel values, only an object pixel value having a difference within a constant range is selected. When the corresponding object pixel values are not obtained, an object identifier may be replaced with an object identifier not used in the encoding target block. In this way, even when there are different objects for each block, it is possible to prevent encoding efficiency from being reduced by incorrect prediction.

As with the H.264/AVC, in the case of selecting a prediction mode optimal for each block from a plurality of prediction modes and performing predictive encoding, it is probable that a prediction mode using no object map in the peripheral block of the encoding target block has been used. In such a case, since information on the peripheral block has not been stored in the object map-storing unit 106 and the like, it is not possible to achieve code amount reduction using the spatial correlation.

In this case, according to a method, instead of accumulating the object map, decoded images obtained by decoding an encoding result are stored, and an object identifier having an object pixel value nearest to a pixel value of each pixel of a decoded image of the peripheral block is allocated to each pixel, so that the reference object map is generated. In this way, it is possible to set the reference object map regardless of a predictive mode of the peripheral block, so that it is possible to reduce a code amount of the object map using the spatial correlation. An image-encoding device at this time is illustrated in FIG. 13.

Figure 13:
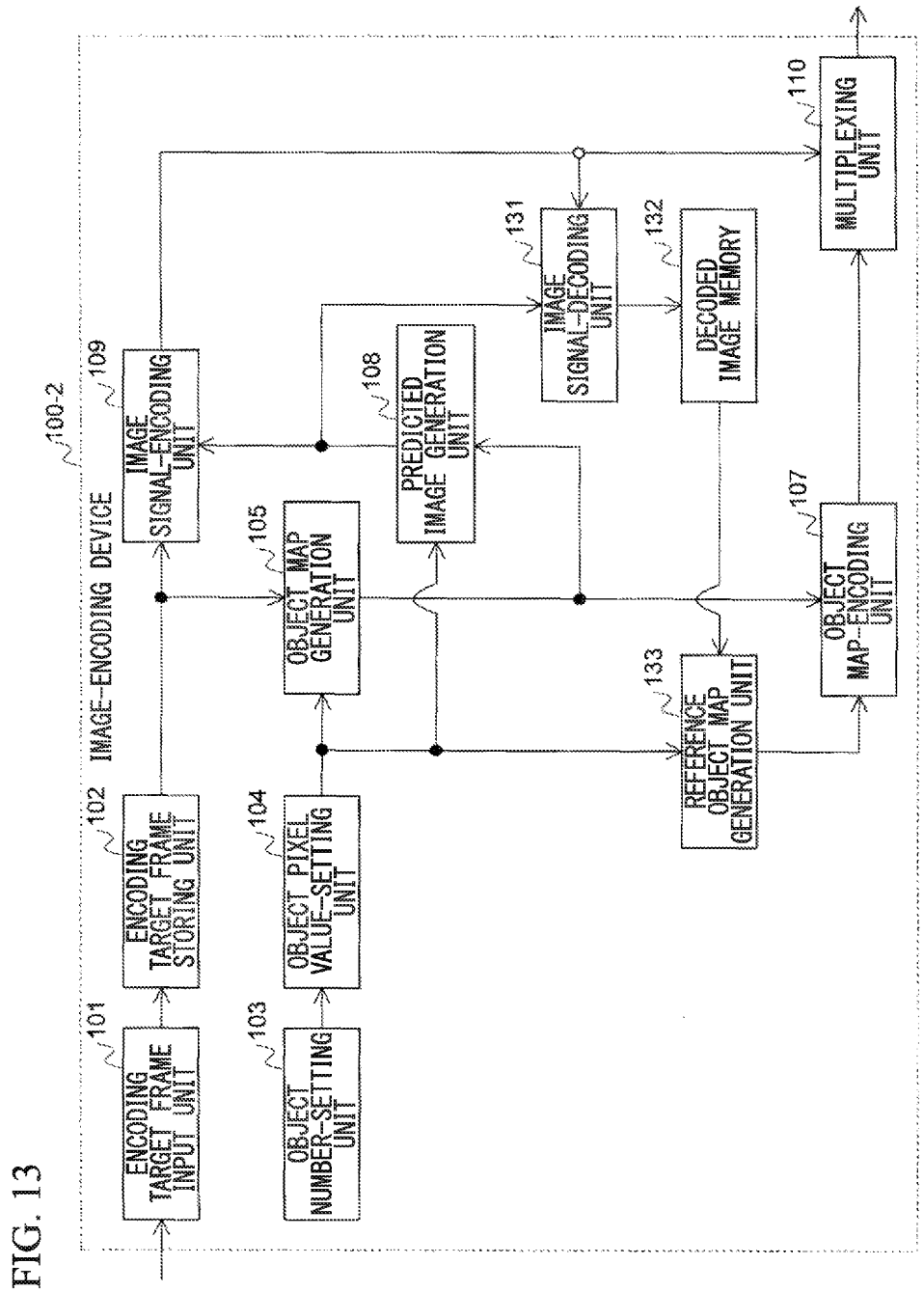
FIG. 13 is a block diagram illustrating still another configuration example of an image-encoding device.

An image-encoding device 100-2 illustrated in FIG. 13 is different from the image-encoding device 100 illustrated in FIG. 2 in that an image signal-decoding unit 131, a decoded image memory 132, and a reference object map generation unit 133 are used instead of the object map-storing unit 106. The image signal-decoding unit 131 decodes an encoding result by the image signal-encoding unit 109, and accumulates a decoded image in the decoded image memory 132. The reference object map generation unit 133 allocates an object identifier having an object pixel value nearest to a pixel value of each pixel of a decoded image of the peripheral block to each pixel, thereby generating the reference object map.

Figure 14:
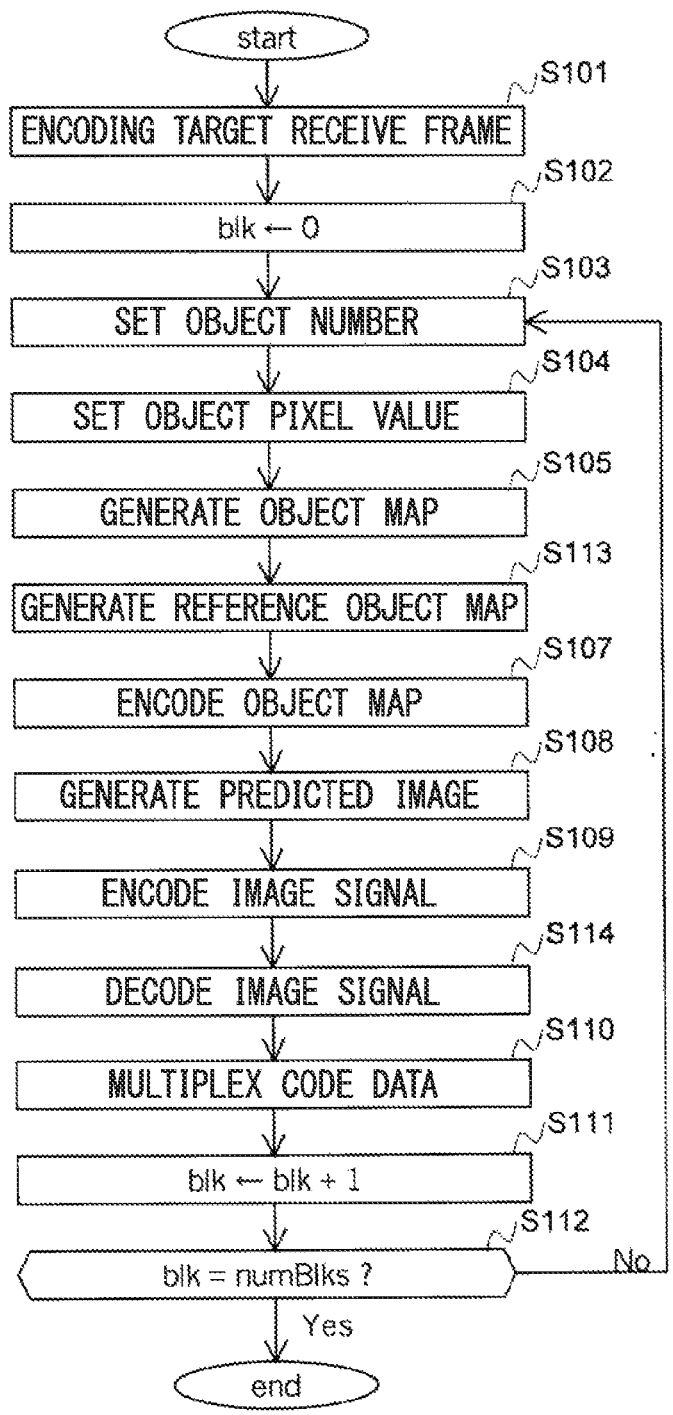
FIG. 14 is a processing flowchart of an image-encoding device.

A process flow of the image-encoding device 100-2 is illustrated in FIG. 14. Only differences from the process flow illustrated in FIG. 3 will be described. After an object map is generated in step S105, and a reference object map to be used in the encoding of the object map is generated with reference to a decoded image of a peripheral block in step S113. Furthermore, in step S 109, an image signal is encoded, and in step S114, the image signal-decoding unit 131 decodes an encoding result and accumulates a decoding result in the decoded image memory 132.

[Second Embodiment]
(Image-decoding Device)

Figure 15:
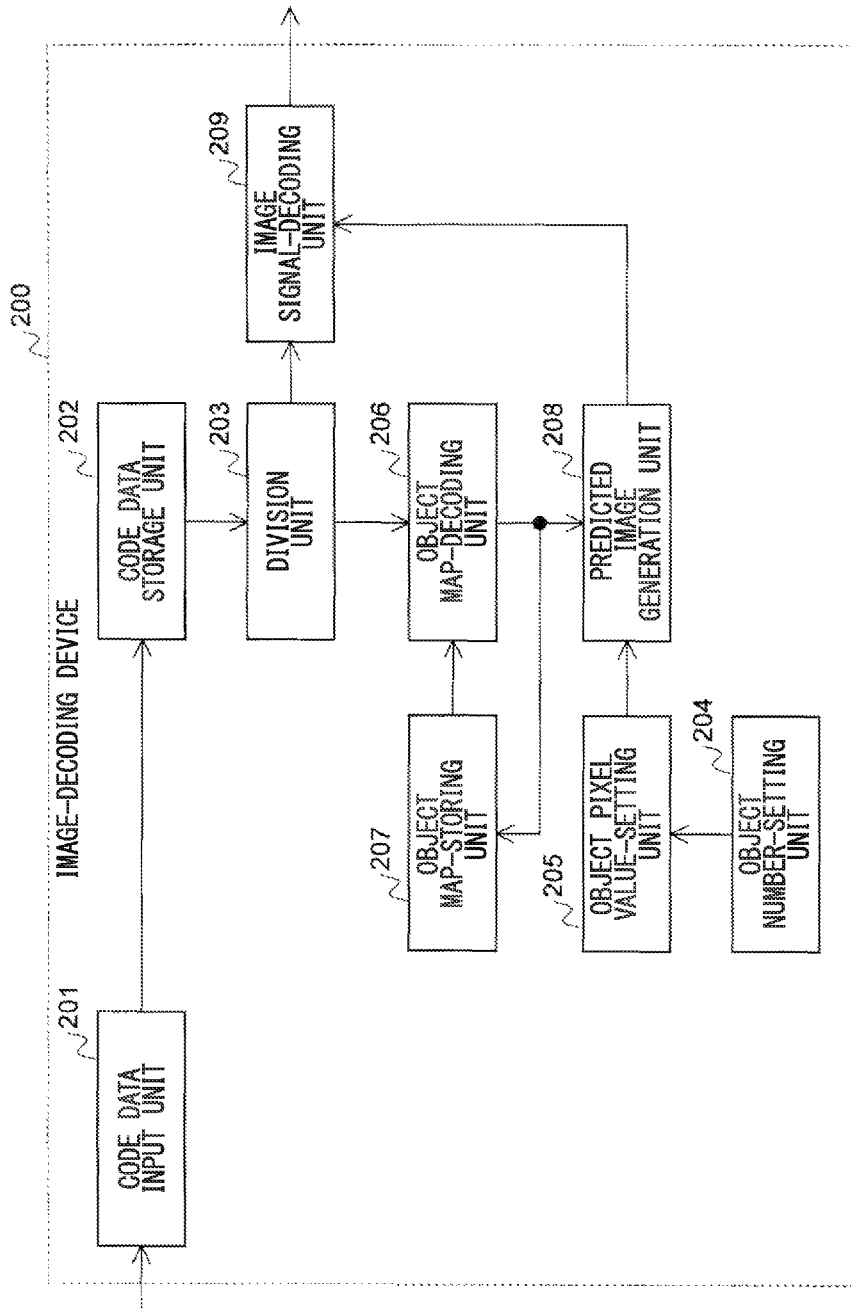
FIG. 15 is a block diagram illustrating a configuration example of an image-decoding device according to a second embodiment of the present invention.

Next, a second embodiment of the present invention will be described. FIG. 15 is a block diagram illustrating a configuration example of an image-decoding device according to the second embodiment. As illustrated in FIG. 15, an image-decoding device 200 includes a code data input unit 201, a code data storage unit 202, a division unit 203, an object number-setting unit 204, an object pixel value-setting unit 205, an object map-decoding unit 206, an object map-storing unit 207, a predicted image generation unit 208, and an image signal-decoding unit 209.

The code data input unit 201 receives code data of an decoding target image frame. The code data storage unit 202 accumulates the received code data. The division unit 203 divides multiplexed code data into code data in which different types of information have been encoded. The object number-setting unit 204 sets the number of objects included in a processing region with a predetermined size. The object pixel value-setting unit 205 sets an object pixel value for each object. The object map-decoding unit 206 decodes an object map from the code data. The object map-storing unit 207 accumulates the decoded object map. The predicted image generation unit 208 generates a predicted image for the processing region from the object pixel value and the object map obtained for the processing region. The image signal-decoding unit 209 decodes an image signal of the decoding target frame from the code data using the predicted image for each processing region.

Figure 16:
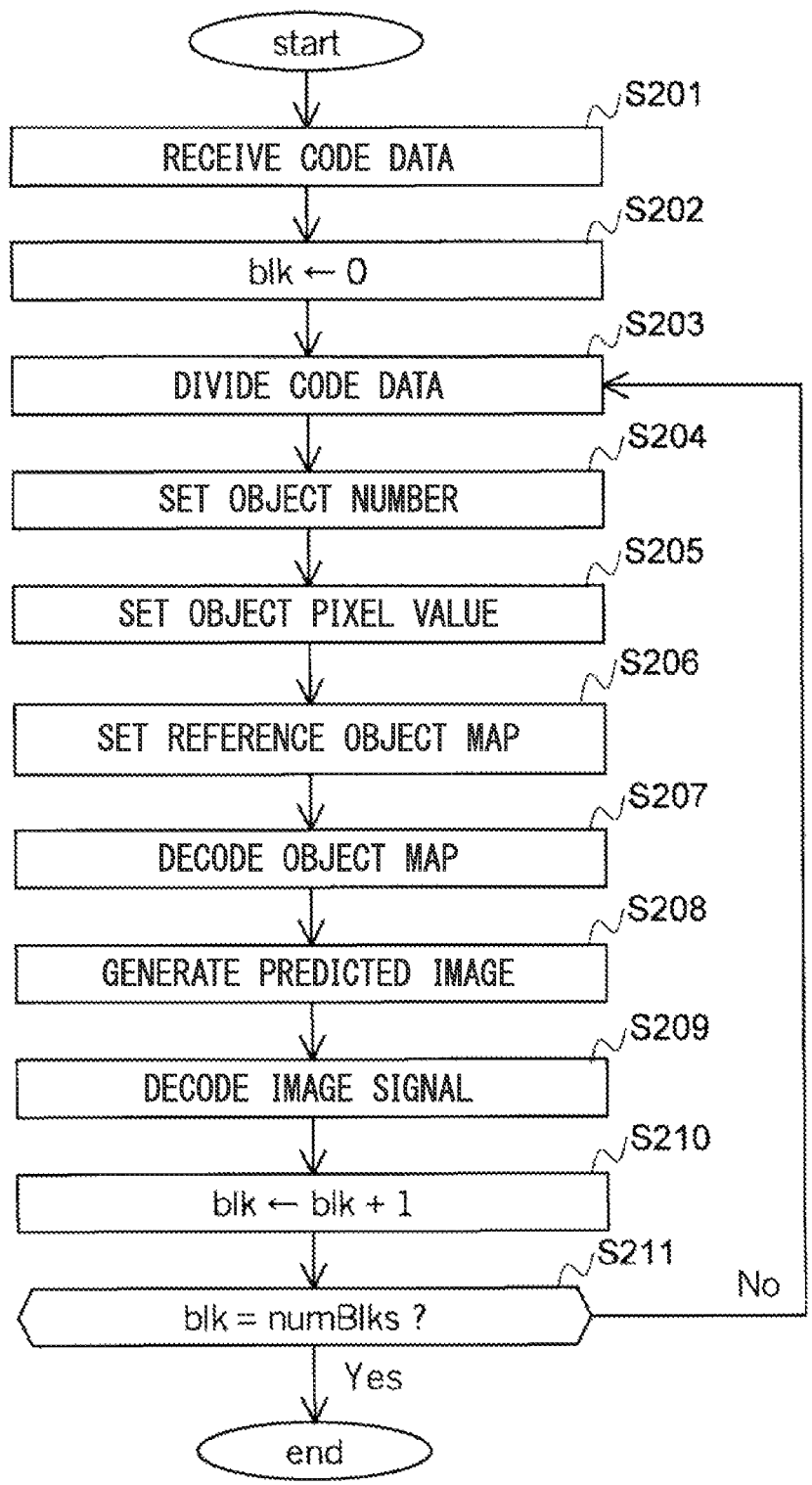
FIG. 16 is a processing flowchart of an image-decoding device according to a second embodiment.

FIG. 16 is a flowchart for explaining an operation of the image-decoding device 200 according to the second embodiment. With reference to the flowchart, processes performed by the image-decoding device 200 will be described in detail.

First, code data for decoding target frames is input to the code data input unit 201, and is stored in the code data storing unit 202 (step S201). After the code data is stored, the decoding target frames are divided and image signals of the encoding target frames are decoded for each divided region (steps S202 to S211). That is, when an index of a decoding target block is indicated by blk and the total number of decoding target blocks is indicated by numBlks, blk is initialized to 0 (step S202), and then the following processes (steps S203 to S209) are repeated until blk is numBlks (step S211) while adding 1 to blk (step S210).

In a process repeated for each decoding target block, first, the division unit 203 divides the input code data into code data having a plurality of types of information (step S203). In the present embodiment, a description will be provided for an example in which the code data having a plurality of types of information is interleaved in units of blocks. However, when the code data is interleaved in units of frames other than blocks, it is not necessary to repeat the division of the code data in units of blocks.

After the code data is divided, the object number-setting unit 204 sets the number numObjs of objects included in the block blk (step S204). The object number is set using the same process as that of the encoding side. For example, when the encoding side always sets a predetermined number, the decoding side sets the same number.

According to another example, when the object number has been encoded and included in code data in order to set different object numbers for each block, the object number-setting unit 204 receives code data of the object number and sets a decoding result value as the object number.

Figure 17:
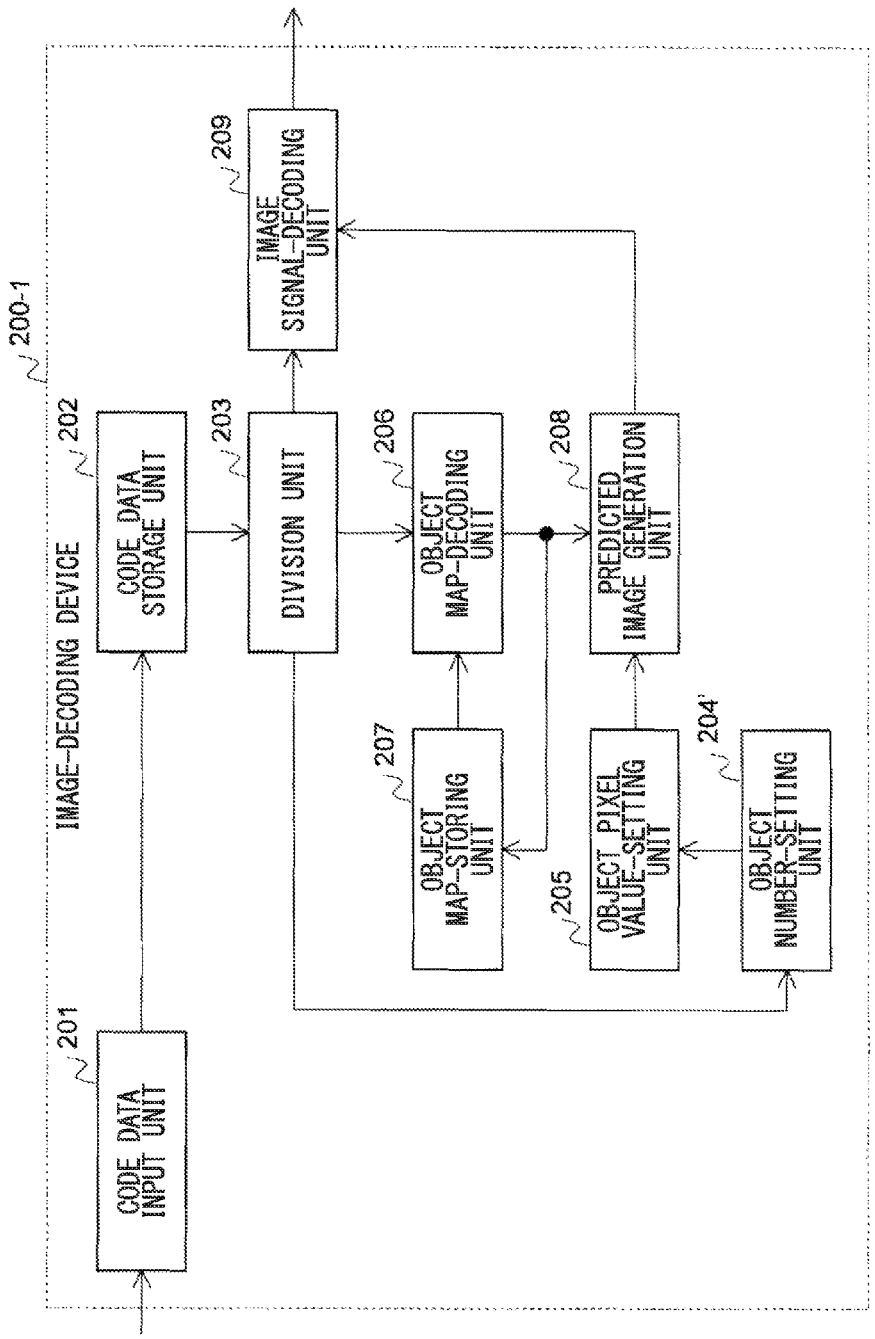
FIG. 17 is a block diagram illustrating a configuration example of an image-decoding device when an object number has been encoded.

FIG. 17 is a block diagram of an image-decoding device when the object number has been encoded. When the object number has been encoded, an object number-setting unit 204' receives code data of the number of objects divided in the division unit 203, and decodes the code data to acquire an object number as illustrated in FIG. 17. In addition, when the object number has been encoded as a difference value with a predicted value generated using information on a pixel value, an object number and the like for a processed block around the block blk, the object number-setting unit 204' generates a predicted value by the same method as that of the encoding side, and adds a value obtained by decoding the code data to the predicted value, thereby acquiring the object number.

In addition, as a method for generating the predicted value, there are a method in which an average value or a center value of the object numbers used when encoding blocks around the block blk is used, or a method in which pixel values of decoded pixel groups around the block blk are analyzed and an object number in the pixel groups is used as the predicted value. In order to generate the predicted value at the time of decoding of another block, it is necessary to accumulate the object number used in the former method, and the pixel value of the decoded image in the latter method.

Furthermore, there is a case in which the object number has been encoded in each set of a plurality of blocks called a frame or a slice, instead of each block. In such a case, object number code data is decoded only once in units of frames or slices and a result of the decoding is temporarily stored, so that repetition is performed until the next update timing and the same value is set.

Moreover, there is a case in which a global object number has been encoded in units of frames or slices and the change amount from each block has been encoded in each block. In such a case, code data of the global object number is decoded only once in units of frames or slices, a result of the decoding is temporarily stored, a value of the change amount to be decoded for each block is added to the coding value, so that an object number to be used in the block is obtained. Moreover, when the change amount is predicted from an adjacent block, a predicted difference of the amount of object change is decoded for each block, and the global object number and a predicted value of the change amount from the adjacent block are added to the decoding value, so that an object number to be used in the block is obtained.

After the object number is set, the object pixel value-setting unit 205 sets one object pixel value Value (i) for each object in the block blk (step S205). i indicates an object identifier for identifying objects and is an integer equal to or more than 0 and smaller than numObjs. Furthermore, the object identifier is allocated according to a predetermined rule. Here, it is assumed that the object identifier is allocated in an ascending order of the object pixel value. The object pixel value is set using the same process as that of the encoding side. For example, when the encoding side uniformly has quantized a range of a pixel value by the object number and has set a center value of each range, the decoding side sets the same value.

According to another method, the object pixel value is set using an object pixel value used when decoding an already decoded block around a decoding target block. In detail, there are a method in which an average value or a center value of object pixel values allocated to the same object identifier in a peripheral block is set as an object pixel value of the decoding target block, and a method in which a set of object pixel values used in the peripheral block is obtained, is divided into numObjs clusters, and an average value or a center value of each cluster is set as the object pixel value of the decoding target block. In this case, for the decoding of another block, the used object pixel value needs to be stored.

According to still another method, the object pixel value is set using a pixel value for an already decoded pixel around the decoding target block. In detail, there is a method in which an already decoded pixel group around the decoding target block is divided into numObjs clusters using the aforementioned clustering technique, and an average value or a center value of pixel values of pixels included in each cluster is set as the object pixel value. In this case, for the decoding of another block, the pixel value of a decoded image needs to be stored.

According to still another method, in order to set different object pixel values for each block, an object pixel value is encoded and included in code data. In such a case, the object pixel value-setting unit 205 receives code data of the object pixel value and sets a decoding result value as the object pixel value.

Figure 18:
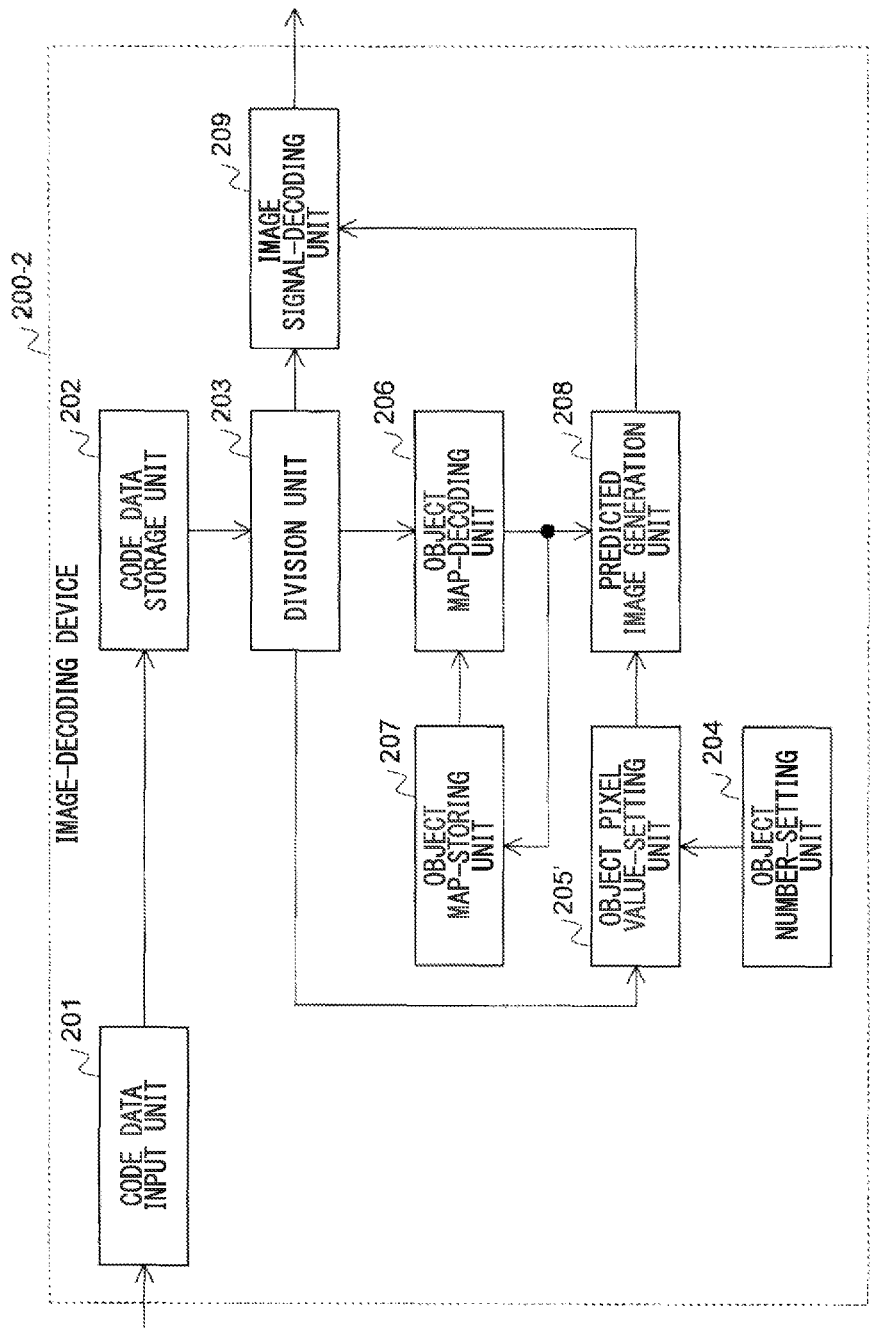
FIG. 18 is a block diagram illustrating a configuration example of an image-decoding device when an object pixel value has been encoded.

FIG. 18 is a block diagram of an image-decoding device when the object pixel value has been encoded. When the object pixel value has been encoded, an object pixel value-setting unit 205' receives code data of the object pixel value divided in the division unit 203, and decodes the code data to acquire the object pixel value as illustrated in FIG. 18. In addition, when the object pixel value has been encoded as a difference value with a predicted value generated using information on a pixel value, an object pixel value and the like for a processed block around the block blk, the object pixel value-setting unit 205' generates a predicted value using the same method as that of the encoding side, and adds a value obtained by decoding the code data to the predicted value, thereby acquiring the object pixel value. In addition, as a method for generating the predicted value, there are a method in which an average value or a center value of the object pixel values used when encoding the blocks around the block blk is used, and a method in which pixel values of decoded pixel groups around the block blk are analyzed and object pixel values for the pixel groups are used as the predicted value. In order to generate the predicted value at the time of decoding of another block, it is necessary to accumulate the object pixel value used in the former method, and the pixel value of the decoded image in the latter method.

After the object pixel value is set, the object map which has been stored in the object map-storing unit 207 and used when decoding the already decoded block around the decoding target block is set as a reference object map (step S206). The reference object map may be selected using the same process as that of the encoding side. For example, the reference object map is set as an object map for a block group having a predetermined positional relationship. According to a detailed example, a set of object maps for blocks positioned at the upper side, the left side, and the left upper side of the encoding target block is set as the reference object map. In addition, when information indicating the selection method of the reference object map has been encoded for each unit such as a frame or a block group, the reference object map is set according to information obtained by decoding data of the encoded information.

Next, the object map-decoding unit 206 decodes the object map from the divided code data using the set reference object map (step S207). In relation to an object map of two-dimensional information, there are a case in which object identifiers of pixels have been encoded in a pixel scan order such as a raster scan order or a zigzag scan order, and a case in which the object map is converted into data with a tree structure such as a quadtree or a binary tree and then information on each node is encoded in a scan order based on depth first search or breadth first search. Thus, a decoding process of the object map is changed according to the method used in the encoding side.

Figure 19:
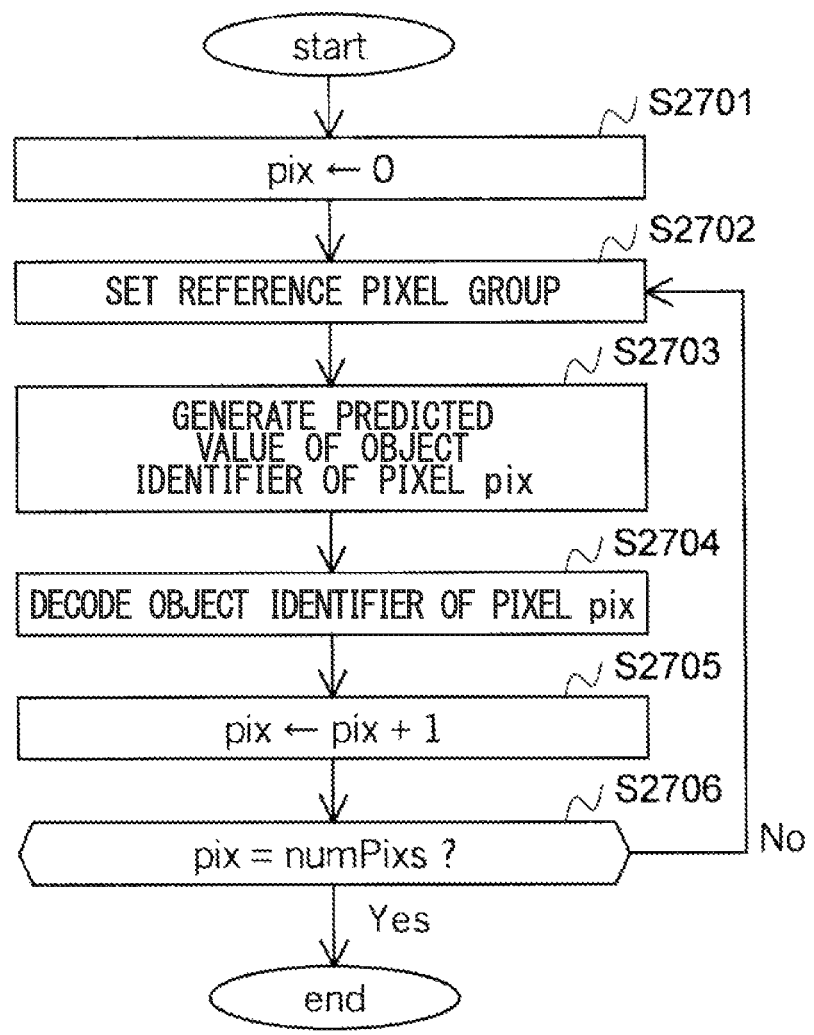
FIG. 19 is a flowchart of a decoding process when an object identifier has been encoded.

A decoding process when the object identifiers of the pixels have been encoded in the pixel scan order such as a raster scan order or a zigzag scan order will be described in detail with reference to the flowchart of FIG. 19. Since the process herein is performed for each pixel in the decoding target block, when an index of a pixel in the decoding target block is indicated by pix and the number of pixels in the decoding target block is indicated by numPixs, pix is initialized to 0 (step S2701), and then the following processes (steps S2702 to S2704) are repeated until pix is numPixs (step S2706) while adding 1 to pix (step S2705).

In a process repeated for each pixel, first, a pixel group around the pixel pix is set as a reference pixel group (step S2702), and a predicted value of the object identifier of the pixel pix is generated from an object identifier for the reference object map (step S2703). In relation to the predicted value, there are a case in which one object identifier is generated, a case in which the occurrence probability of each object identifier is generated, and a case in which both of them are generated. The same predicted value as that of the encoding side is generated. Processes herein are the same as those performed at the time of encoding in step S1702 and step S1703 of the flowchart of FIG. 5.

After the predicted value is generated, the object identifier for the pixel pix is decoded from code data using the predicted value (step S2704). When one predicted object identifier has been provided, binary information indicating whether the prediction is correct is first decoded from the code data. As a consequence, when it is determined that the prediction is correct, the predicted value is set as the object identifier for the pixel pix. When it is determined that the prediction is not correct, the object identifier for the pixel pix is decoded from the code data. When the occurrence probability has been provided, the object identifier for the pixel pix is decoded from the code data according to the probability. When information on both of them has been provided, binary information indicating whether the prediction is correct is first decoded from the code data. Then, when it is determined that the prediction is correct, the predicted value is set as the object identifier for the pixel pix. When it is determined that the prediction is not correct, the object identifier for the pixel pix is decoded from the code data according to the provided occurrence probability. A detailed decoding process uses the method for the encoding process. In addition, when the occurrence probability has been arithmetically encoded while changing the occurrence probability in response to an encoding history, after the object identifier for the pixel pix is decoded, the used probability table is updated in response to the decoded object identifier. An update method is the same as that of the encoding side, so that it is possible to correctly perform decoding.

Figure 20:
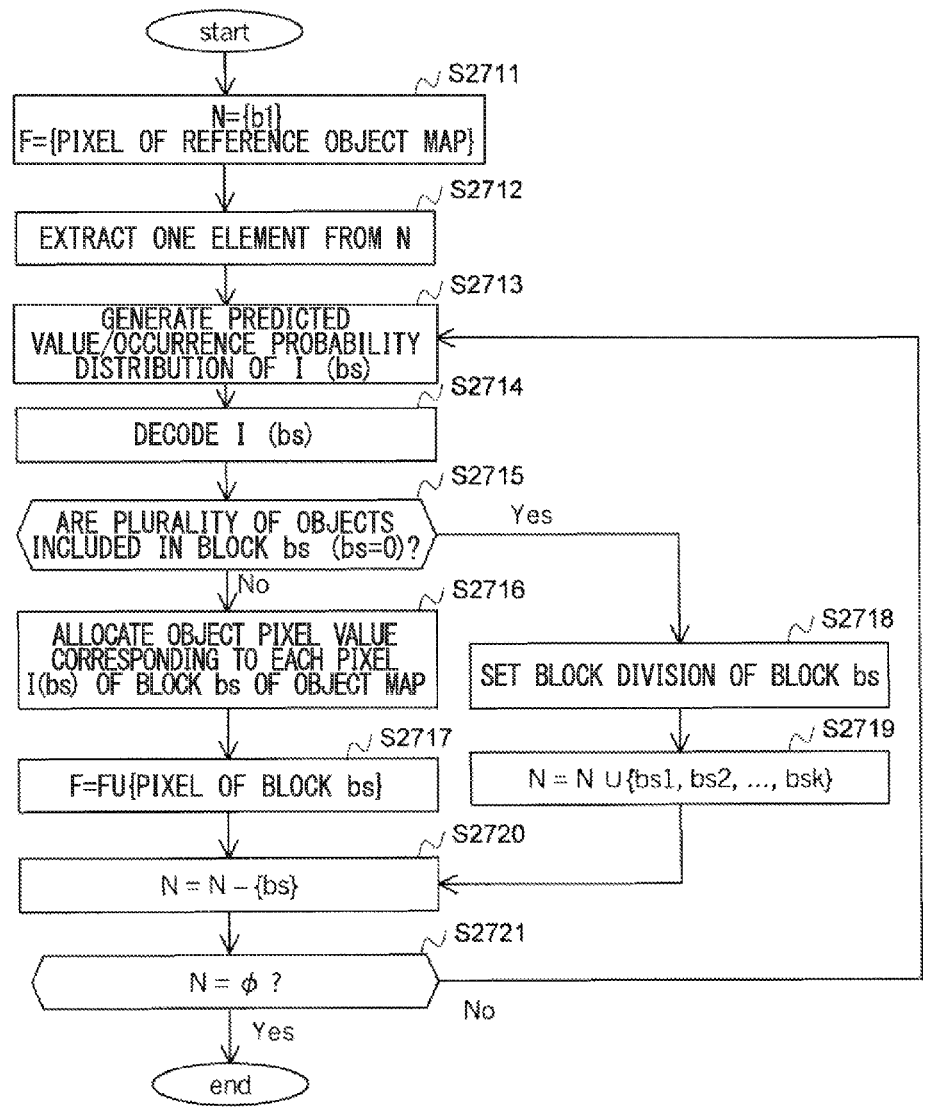
FIG. 20 is a flowchart of a decoding process when information of each node of an object map has been encoded.

With reference to the flowchart of FIG. 20, a detailed description will be provided for a process when information on each node has been encoded in a scan order of depth first search after the object map is converted into data with a tree structure. In addition, the data with a tree structure corresponds to two-dimensional information expressed by setting the block blk as a root, setting a plurality of sub-blocks obtained by dividing a block of a parent node to correspond to child nodes of each node, and assigning information on corresponding regions to the nodes. The data with a tree structure may be arbitrarily defined, but it is necessary to use the same definition as that used in the encoding side.

According to a process of decoding the code data through conversion to the data with a tree structure, node information on blocks is decoded starting from the decoding target block, the block is divided in response to the decoded node information to generate sub-blocks, and the same process is recursively performed for the sub-blocks, so that the object map is encoded. That is, when a set of non-processed blocks is indicated by N, a set of processed pixels is indicated by F, and the block blk is indicated by b1, after N is initialized to {b1} and F is initialized to a set of pixels included in the reference object map (step S2711), the following processes (steps S2712 to S2720) are repeated until N is an empty set (step S2721).

In the process that is repeated until N is an empty set, one block is first extracted from N (step S2712). At this time, a block to be extracted is decided according to a predetermined rule. When a scan order of a tree is set as depth first search, LIFO (Last In First Out) is applied, that is, a block entered later is first extracted as with a stack. When the scan order is set as breadth first search, FIFO (First In First Out) is applied, that is, a block entered first is first extracted as with a queue. Hereinafter, it is assumed that the extracted block is indicated by bs. In addition, an extraction order should be the same order as that at the time of encoding.

Next, a predicted value or an occurrence probability distribution of the information I (bs), or both of them are generated using information on object identifiers for the pixel group F (step S2713). In the present embodiment, when object identifiers of all pixels in the block bs are equal to one another, a number obtained by adding 1 to the number of the object identifiers is set as I (bs), and otherwise, 0 is assigned as I (bs). The process herein is the same as that performed at the time of encoding in step S1714 of the flowchart of FIG. 6.

After the predicted value and the occurrence probability distribution of I (bs) are generated, I (bs) is decoded from the code data using information on the predicted value and the occurrence probability distribution (step S2714). In the case in which the predicted value has been generated in step S2713, binary information indicating whether the predicted value is correct is decoded. When it is determined that the prediction is correct based on the obtained binary information, the predicted value is set as I (bs). When it is determined that the prediction is not correct based on the obtained binary information, I (bs) is decoded from the code data. In addition, when the occurrence probability distribution has been generated in step S2713, I (bs) is entropy-decoded according to the probability. A detailed decoding process uses a method corresponding to the encoding process. In addition, when encoding has been performed while changing the generation of the occurrence probability distribution in response to a history, after I (bs) is decoded, the used probability table is updated in response to the obtained I (bs). An update method is the same as that at the time of encoding, so that it is possible to correctly perform decoding.

Next, the decoded I (bs) is checked, and it is checked whether a plurality of objects are included in the block bs (step S2715). The checking methods are changed according to the definition of the data with a tree structure. Here, it is checked whether I (bs) is 0. When I (bs) is not 0, an object identifier I (bs)−1 is allocated to all pixels included in the block bs on the object map (step S2716), pixels included in the block bs are added to F (step S2717), and bs is removed from N to complete a process for the block bs (step S2720).

When I (bs) is 0, a division method of the block bs is first set (step S2718). The division method may be arbitrarily set. However, the division method needs to be the same as that performed at the time of encoding. In addition, the process herein is the same as step S1718 of the flowchart of FIG. 6. After the block division is set, the block bs is divided according to the block division to generate a plurality of sub-blocks. At this time, the generated sub-blocks are scanned in a predetermined order such as a raster scan order or a zigzag scan order, and are added to N in this order. This process is the same as step S1719 of the flowchart of FIG. 6. Then, bs is removed from N to complete the process for the block bs (step S2720).

In addition, since the definition and the like of the tree structure described herein are an example, any methods are possible as long as the definition is shared by the encoding side.

After the object map is decoded, the predicted image generation unit 208 generates a predicted image for the block blk (step S208). In detail, the object pixel value corresponding to the object identifier obtained from the object map is allocated to each pixel, so that the predicted image is generated.

In addition, dither may be further added to the predicted image generated as described above. In the predicted image using the object map and the object pixel value, since there are only pixel values having the same number as that of objects, the predicted image has properties different from those of a natural image. In this regard, dither is added to approximate a natural image. In order to generate the dither, an arbitrary method may be used. However, it is necessary to use the same technique as that of the encoding side. In addition, when a parameter required for initialization and the like of a dither generation device is included in code data, the parameter is decoded for use.

After the predicted image is obtained, the image signal-decoding unit 209 decodes an image signal for the block blk (step S209). The decoding of the image signal is changed according to the method used at the time of encoding. For example, when the general encoding of MPEG-2 or H.264/AVC has been used, the image signal-decoding unit 209 decodes a predictive residual by performing entropy-decoding, inverse binarization, inverse quantization, or a frequency inverse transform such as an IDCT for the code data, and adds the predicted image to a result of the decoding, thereby restoring the image signal for the block blk.

When the object number is 1 in a special situation, since there is only one object map, there is a case in which an object map for a block is not encoded and thus a code amount is reduced. In such a case, it is sufficient if a unique object map candidate of the object map is set as the object map for the block without decoding object map code data. In addition, when the object number is 1, it is necessary to decide whether to decode the object map similarly to the process at the time of encoding.

When an object map has been encoded using different object numbers and different object pixel values for each block, by the stored object map and a decoding target object map, the same object may be expressed using different object identifiers, and different objects may be expressed using the same object identifier. In this case, when the stored object map is used as is, it is not possible to correctly predict an object map of a decoding target block.

In such a case, after the object pixel values are also stored in addition to the object maps, when setting the reference object map in step S206, an object pixel value used when decoding a block corresponding to each object map is compared with an object pixel value for the decoding target block, an object identifier of the stored object map is converted to an object identifier set for the decoding target block, and the converted object map is set as the reference object map. In this way, a reference object map expressed by the same object identifier is available for the same object, so that it is possible to perform correct prediction using the spatial correlation. An image-decoding device at this time is illustrated in FIG. 21.

Figure 21:
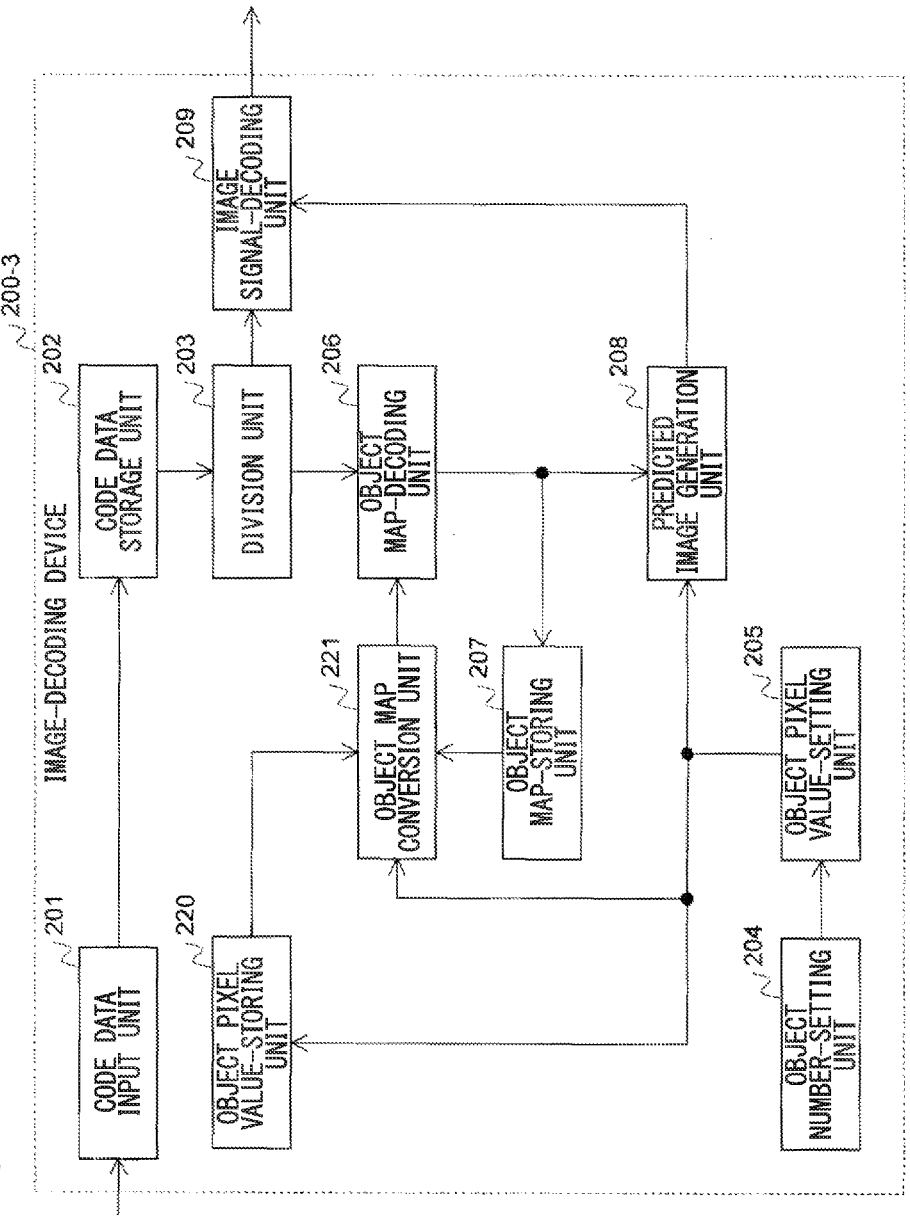
FIG. 21 is a block diagram illustrating another configuration example of an image-decoding device.

In an image-decoding device 200-3 illustrated in FIG. 21, an object pixel value-storing unit 220 accumulates the object pixel value used when decoding the block corresponding to each object map, and an object map conversion unit 221 compares the object pixel value stored in the object pixel value-storing unit 220 with the object pixel value for the decoding target block, and converts an object identifier of the stored object map to an object identifier set for the decoding target block. That is, when setting the reference object map, the object map conversion unit 221 compares an object pixel value used when decoding a reference region with an object pixel value set for a processing region, generates a substitution matrix in which the object identifier of the stored object map is replaced with the object identifier set for the decoding target block, and converts an object map used when encoding the reference region according to the substitution matrix, thereby generating the reference object map. Other configurations are the same as the aforementioned example.

In addition, the object identifier may be converted using arbitrary methods if they are the same as those of the encoding side. An example of a detailed conversion process flow is illustrated in FIG. 12A and FIG. 12B.

As with the H.264/AVC, in the case of selecting a prediction mode optimal for each block from a plurality of prediction modes and performing predictive encoding, it is probable that a prediction mode using no object map in the peripheral block of the decoding target block has been used. In such a case, since information on the peripheral block has not been stored in the object map-storing unit 207 and the like, it is not possible to achieve code amount reduction using the spatial correlation.

In this case, according to a method, instead of accumulating the object map, an object identifier having an object pixel value nearest to a pixel value of each pixel of a decoded image of the peripheral block is allocated to each pixel, so that the reference object map is generated. In this way, it is possible to set the reference object map regardless of a predictive mode of the peripheral block, so that it is possible to perform correct prediction using the spatial correlation. An image-decoding device at this time is illustrated in FIG. 22.

Figure 22:
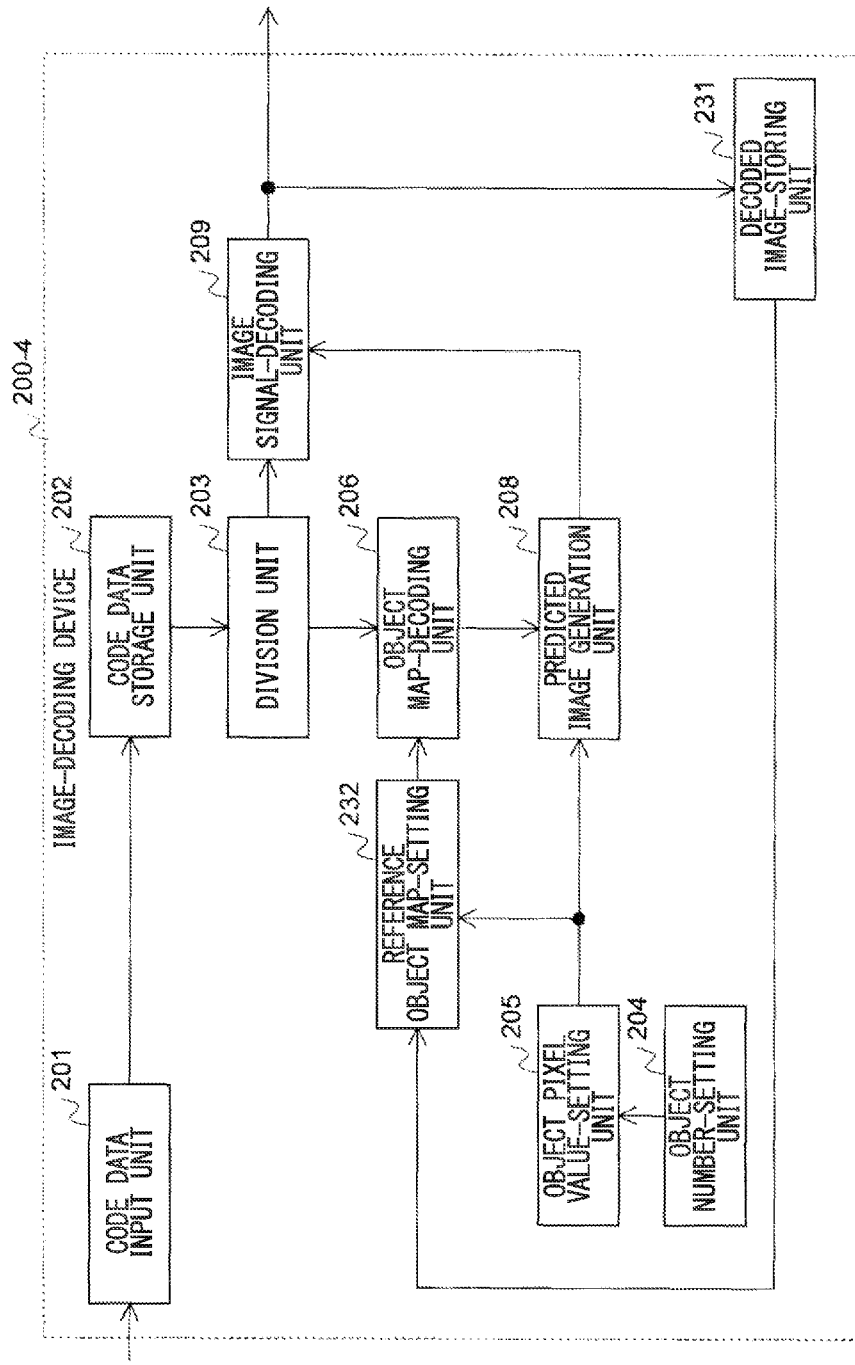
FIG. 22 is a block diagram illustrating another configuration example of an image-decoding device.

In an image-decoding device 200-4 illustrated in FIG. 22, the decoded image decoded by the image signal-decoding unit 209 is stored in a decoded image-storing unit 231, and a reference object map-setting unit 232 allocates, to each pixel, the object identifier having the object pixel value nearest to the pixel value of each pixel of the decoded image of the peripheral block, thereby setting the reference object map regardless of the predictive mode of the peripheral block. Other parts are the same as the aforementioned example.

According to the aforementioned first and second embodiments, the processes of encoding and decoding all blocks of one frame according to the present invention have been described. However, it may be applied to only some of the blocks, and other blocks may be encoded using intra-frame predictive encoding, motion-compensated predictive encoding and the like used in H.264/AVD and the like. In this case, it is necessary to encode and decode information indicating a method to be used to encode each block.

According to the aforementioned first and second embodiments, the processes of encoding and decoding one frame have been described. However, the present invention can also be applied to moving image encoding through repetition of a plurality of frames. Furthermore, the present invention can also be applied only to some frames or some blocks of a moving image. In this case, since there is spatial and temporal continuity in the presence of an object, it is possible to easily derive that a definition of a reference pixel used in encoding of an object map and an adjacent block used in prediction of an object pixel value is expanded in the temporal direction as well as the spatial direction for use.

The aforementioned image encoding and decoding processes may also be performed by a computer and a software program, and the program may be recorded on a computer readable recoding medium and provided through a network.

Figure 23:
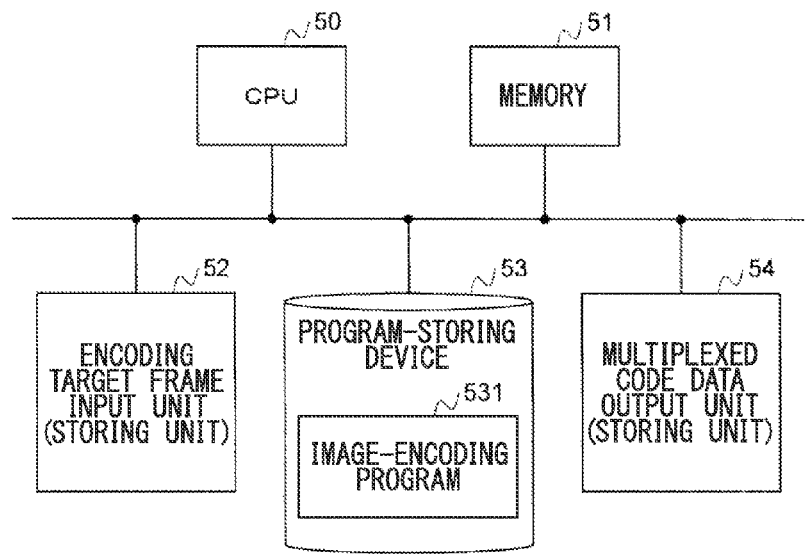
FIG. 23 is a diagram illustrating a hardware configuration example when an image-encoding device is configured of a computer and a software program.

FIG. 23 illustrates a hardware configuration example when the image-encoding device is configured of a computer and a software program. The present sequence has a configuration in which a CPU 50 for executing the program, a memory 51 such as a RAM, an encoding target frame input unit 52 (which may be a storing unit for storing an image signal by a disk device and the like), a program-storing device 53, and a multiplexed code data output unit 54 (which may be a storing unit for storing multiplexed code data by a disk device and the like) are connected to one another through a bus. The memory 51 stores the program or data that is accessed by the CPU 50. The encoding target frame input unit 52 receives an image signal to be encoded from a camera and the like. The program-storing device 53 stores an image-encoding program 531 that is a software program for allowing the CPU 50 to perform the image encoding processes described in the first embodiment. The multiplexed code data output unit 54 outputs multiplexed code data, which is generated by executing the image-encoding program 531 loaded to the memory 51 by the CPU 50, through a network.

Although not illustrated in the drawing, hardware, which includes an object number-storing unit, an object map-storing unit, an object pixel value-storing unit, a predicted image-storing unit, an object map code data storing unit, an image information code data storing unit, a decoded image-storing unit and the like, is further provided, and is used to perform the present technique. Furthermore, an object pixel value code data storing unit may be used. Moreover, an object number code data storing unit, an object number predicted value-storing unit, an object pixel value predicted value-storing unit, an object identifier predicted value-storing unit, an object occurrence probability distribution storing unit, and a converted object map-storing unit may be used.

Figure 24:
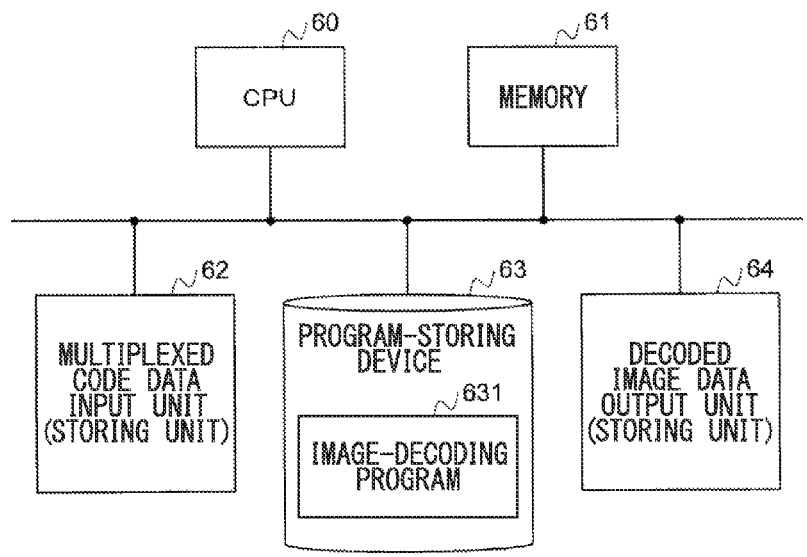
FIG. 24 is a diagram illustrating a hardware configuration example when an image-decoding device is configured of a computer and a software program.

FIG. 24 illustrates a hardware configuration example when the image-decoding device is configured of a computer and a software program. The present sequence has a configuration in which a CPU 60 for executing the program, a memory 61 such as a RAM, a multiplexed code data input unit 62 (which may be a storing unit for storing multiplexed code data by a disk device and the like), a program-storing device 63, and a decoded image data output unit 64 are connected to one another through a bus. The memory 61 stores the program or data that is accessed by the CPU 60. The multiplexed code data input unit 62 receives multiplexed code data encoded by the image-encoding device using the present technique. The program-storing device 63 stores an image-decoding program 631 that is a software program for allowing the CPU 60 to perform the image decoding processes described in the second embodiment. The decoded image data output unit 64 outputs decoded image data, which is obtained by decoding the multiplexed code data through the execution of the image-decoding program 631 loaded to the memory 61 by the CPU 60, to a reproduction device and the like.

Although not illustrated in the drawing, hardware, which includes an object number-storing unit, an object map-storing unit, an object pixel value-storing unit, a predicted image-storing unit, an object map code data storing unit, an image information code data storing unit and the like, is further provided, and is used to perform the present technique. Furthermore, an object pixel value code data storing unit may be used. Moreover, an object number code data storing unit, an object number predicted value-storing unit, an object pixel value predicted value-storing unit, an object identifier predicted value-storing unit, an object occurrence probability distribution storing unit, and a converted object map-storing unit may be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention makes it possible to generate a predicted image in which a predictive residual is small and to achieve a reduction of a code amount and an improvement of image quality.

REFERENCE SIGNS LIST

100 Image-encoding device
101 Encoding target frame input unit
102 Encoding target frame storing unit
103 Object number-setting unit
104 Object pixel value-setting unit
105 Object map generation unit
106 Object map-storing unit
107 Object map-encoding unit
108 Predicted image generation unit
109 Image signal-encoding unit
110 Multiplexing unit
120 Object pixel value-storing unit
121 Object map conversion unit
131 Image signal-decoding unit
132 Decoded image memory 133 Reference object map generation unit
201 Code data input unit
202 Code data storage unit
203 Division unit
204 Object number-setting unit
205 Object pixel value-setting unit
206 Object map-decoding unit
207 Object map-storing unit
208 Predicted image generation unit
209 Image signal-decoding unit
220 Object pixel value-storing unit
221 Object map conversion unit
231 Decoded image-storing unit
232 Reference object map-setting unit

The invention claimed is:

1. An image-encoding method, in which, when an image is transmitted and stored, an image frame is divided into processing regions with a predetermined size and encoding is performed while predicting a pixel value of each pixel for each processing region, the image-encoding method comprising:
   an object number-setting step of setting a number of objects in the processing region as an object number;
   an object pixel value-setting step of associating the objects in the processing region with object identifiers for identifying the objects, and setting one pixel value representing each object as an object pixel value;
   an object map generation step of generating an object map, which indicates an object in each pixel in the processing region by the object identifier, using the object pixel value;
   a reference object map-setting step of setting an object map, which is used when encoding a reference region which is an already encoded region around the processing region, as a reference object map;
   an object map-encoding step of encoding the object map using the reference object map;
   a predicted image generation step of generating a predicted image for the processing region by assigning the object pixel value to each pixel according to the object map; and
   an image signal-encoding step of performing predictive encoding on an image signal for the processing region using the predicted image.

2. The image-encoding method according to claim 1, further comprising:
   a substitution matrix generation step of comparing an object pixel value used when encoding the reference region with the object pixel value set for the processing region, and thereby generating a substitution matrix in which an object identifier used when encoding the reference region is replaced with the object identifier set for the processing region,
   wherein, the reference object map-setting step converts the object map used when encoding the reference region according to the substitution matrix, and thereby generates the reference object map.

3. The image-encoding method according to claim 1, further comprising:
   an image signal-decoding step of decoding image signal code data generated in the image signal-encoding step using the predicted image, thereby generating an image signal of a decoded image for the processing region,
   wherein the reference object map-setting step assigns the object identifier having the object pixel value nearest to a pixel value of a decoded image for each pixel to an already encoded pixel group around the processing region, and thereby generates the reference object map.

4. The image-encoding method according to claim 1, further comprising:
   a region division-setting step of setting a division method of a region to be processed according to edge information on an object identifier of the reference object map; and
   an object map conversion step of converting the object map to a tree structured object map expressed by the tree structure according to the division method,
   wherein, in the object map-encoding step, the tree structured object map is encoded using the reference object map.

5. An image-decoding method, in which, when code data of an image is decoded, an image frame is divided into processing regions with a predetermined size and decoding is performed while predicting a pixel value of each pixel for each processing region, the image decoding method comprising:
   an object number-setting step of setting a number of objects in the processing region as an object number;
   an object pixel value-setting step of associating the objects in the processing region with object identifiers for identifying the objects, and setting one pixel value representing each object as an object pixel value;
   a reference object map-setting step of setting an object map that is used when decoding a reference region which is an already decoded region around the processing region, as a reference object map;
   an object map-decoding step of decoding an object map, in which an object in each pixel in the processing region is expressed by the object identifier, from the code data using the reference object map;
   a predicted image generation step of generating a predicted image for the processing region by assigning the object pixel value to each pixel according to the object map; and
   an image signal-decoding step of decoding an image signal of a decoded image for the processing region using the predicted image.

6. The image decoding method according to claim 5, further comprising:
   a substitution matrix generation step of comparing an object pixel value used when decoding the reference region with the object pixel value set for the processing region, and thereby generating a substitution matrix in which an object identifier used when decoding the reference region is replaced with the object identifier set for the processing region,
   wherein, the reference object map-setting step converts the object map used when decoding the reference region according to the substitution matrix, and thereby generates the reference object map.

7. The image decoding method according to claim 5, wherein, the reference object map-setting step assigns the object identifier having the object pixel value nearest to a pixel value of a decoded image for each pixel to an already decoded pixel group around the processing region, and thereby generates the reference object map.

8. The image decoding method according to claim 5, further comprising:
   a region division-setting step of setting a division method of a region to be processed according to edge information on an object identifier of the reference object map,
   wherein, in the reference object map-setting step, a tree structured object map, which is expressed by the tree structure, is decoded from the code data according to the division method, and the tree structured object map is converted to the object map.

9. An image-encoding device, in which, when an image is transmitted and stored, an image frame is divided into processing regions with a predetermined size and encoding is performed while predicting a pixel value of each pixel for each processing region, the image-encoding device comprising:
   an object number-setting unit which sets a number of objects in the processing region as an object number;
   an object pixel value-setting unit which associates the objects in the processing region with object identifiers for identifying the objects, and sets one pixel value representing each object as an object pixel value;
   an object map generation unit which generates an object map, which indicates an object in each pixel in the processing region by the object identifier, using the object pixel value;
   a reference object map-setting unit which sets an object map, which is used when encoding a reference region which is an already encoded region around the processing region, as a reference object map;
   an object map-encoding unit which encodes the object map using the reference object map;
   a predicted image generation unit which generates a predicted image for the processing region by assigning the object pixel value to each pixel according to the object map; and
   an image signal-encoding unit which performs predictive encoding on an image signal for the processing region using the predicted image.

10. The image-encoding device according to claim 9, further comprising:
    a substitution matrix generation unit which compares an object pixel value used when encoding the reference region with the object pixel value set for the processing region, and thereby generates a substitution matrix in which an object identifier used when encoding the reference region is replaced with the object identifier set for the processing region,
    wherein the reference object map-setting unit converts the object map, which has been used when encoding the reference region, according to the substitution matrix, thereby generating the reference object map.

11. The image-encoding device according to claim 9, further comprising:
    an image signal-decoding unit which decodes image signal code data generated in the image signal-encoding step using the predicted image, thereby generating an image signal of a decoded image for the processing region,
    wherein the reference object map-setting unit assigns the object identifier having the object pixel value nearest to a pixel value of a decoded image for each pixel to an already encoded pixel group around the processing region, thereby generating the reference object map.

12. The image-encoding device according to claim 9, further comprising:
    a region division-setting unit which sets a division method of a region to be processed according to edge information on an object identifier of the reference object map; and
    an object map conversion unit which converts the object map to a tree structured object map, which is expressed by the tree structure, according to the division method, wherein the object map-encoding unit encodes the tree structured object map using the reference object map.

13. An image-decoding device, in which, when code data of an image is decoded, an image frame is divided into processing regions with a predetermined size and decoding is performed while predicting a pixel value of each pixel for each processing region, the image-decoding device comprising:
    an object number-setting unit which sets a number of objects in the processing region as an object number;
    an object pixel value-setting unit which associates the objects in the processing region with object identifiers for identifying the objects, and sets one pixel value representing each object as an object pixel value;
    a reference object map-setting unit which sets an object map, which is used when decoding a reference region of a region which is an already decoded region around the processing region, as a reference object map;
    an object map-decoding unit which decodes an object map, in which an object in each pixel in the processing region is expressed by the object identifier, from the code data using the reference object map;
    a predicted image generation unit which generates a predicted image for the processing region by assigning the object pixel value to each pixel according to the object map; and
    an image signal-decoding unit which decodes an image signal of a decoded image for the processing region using the predicted image.

14. The image-decoding device according to claim 13, further comprising:
    a substitution matrix generation unit which compares an object pixel value used when decoding the reference region with the object pixel value set for the processing region, and thereby generates a substitution matrix in which an object identifier used when decoding the reference region is replaced with the object identifier set for the processing region,
    wherein the reference object map-setting unit coverts the object map, which has been used when decoding the reference region, according to the substitution matrix, thereby generating the reference object map.

15. The image-decoding device according to claim 13, wherein the reference object map-setting unit assigns the object identifier having the object pixel value nearest to a pixel value of a decoded image for each pixel to an already decoded pixel group around the processing region, thereby generating the reference object map.

16. The image-decoding device according to claim 13, further comprising:
    a region division-setting unit which sets a division method of a region to be processed according to edge information on an object identifier of the reference object map,
    wherein the reference object map-setting unit decodes a tree structured object map, which is expressed by the tree structure, from the code data according to the division method, and converts the tree structured object map to the object map.

17. A non-transitory computer-readable storage medium which stores an image-encoding program for causing a computer to execute the image-encoding method according to claim 1.

18. A non-transitory computer-readable storage medium which stores an image-decoding program for causing a computer to execute the image decoding method according to claim 5.

* * * * *